(12) United States Patent
Frieder, III et al.

(10) Patent No.: US 11,350,689 B2
(45) Date of Patent: Jun. 7, 2022

(54) HELMET MOUNTED VISOR

(71) Applicant: Gentex Corporation, Simpson, PA (US)

(72) Inventors: Leonard P. Frieder, III, Clarks Summit, PA (US); Matthew Hanudel, Waltham, MA (US)

(73) Assignee: GENTEX CORPORATION, Simpson, PA (US)

(*) Notice: Subject to any disclaimer, the term of this patent is extended or adjusted under 35 U.S.C. 154(b) by 272 days.

(21) Appl. No.: 16/477,804

(22) PCT Filed: Jan. 13, 2018

(86) PCT No.: PCT/US2018/013676
§ 371 (c)(1),
(2) Date: Jul. 12, 2019

(87) PCT Pub. No.: WO2018/132777
PCT Pub. Date: Jul. 19, 2018

(65) Prior Publication Data
US 2019/0365009 A1    Dec. 5, 2019

Related U.S. Application Data

(60) Provisional application No. 62/445,757, filed on Jan. 13, 2017.

(51) Int. Cl.
*A42B 3/18*    (2006.01)

(52) U.S. Cl.
CPC .................... *A42B 3/185* (2013.01)

(58) Field of Classification Search
CPC ......... A42B 3/185; A42B 3/228; A42B 3/221; A42B 3/222; A42B 3/205; A42B 3/08; A61F 9/026; A61F 9/027
See application file for complete search history.

(56) References Cited

U.S. PATENT DOCUMENTS 2,780,814 A * 2/1957 Matthew ............... A42B 3/221
                                                    2/8.1
2,903,700 A * 9/1959 Walter .................. A61F 9/025
                                                    2/10
(Continued)

FOREIGN PATENT DOCUMENTS

AU    2018207207 A1    8/2019
DE      20306048 U     7/2003
(Continued)

OTHER PUBLICATIONS

Translation of DE20306048, Salomon S.A., Apr. 16, 2002, translated via Espacenet and Google. (Year: 2002).*
(Continued)

*Primary Examiner* — Heather Mangine
(74) *Attorney, Agent, or Firm* — Morgan, Lewis & Bockius LLP

(57) ABSTRACT

A visor system for a helmet includes a lens sized to extend across at least a portion of a user's face, a frame secured along a top portion of the lens and configured to receive and abut against a front surface of the helmet, a first fastener coupled to a first end of the frame by a first flexible attachment, and a second fastener coupled to a second end of the frame by a second flexible attachment. The visor system may further include a first anchor releasably securable to the first fastener, the first anchor being mountable onto a first portion of the helmet, and a second anchor releasably securable to the second fastener, the second anchor being mountable onto a second portion of the helmet.

22 Claims, 18 Drawing Sheets

(56) References Cited

U.S. PATENT DOCUMENTS

| | | | | |
|---|---|---|---|---|
| 2,936,458 | A | * | 5/1960 | Luisada .................. A61F 9/027 2/435 |
| 3,931,646 | A | * | 1/1976 | Loughner ............... A61F 9/027 2/452 |
| 4,686,712 | A | | 8/1987 | Spiva |
| 4,847,920 | A | | 7/1989 | Aileo et al. |
| 5,341,516 | A | * | 8/1994 | Keim ..................... A42B 3/185 2/424 |
| 6,282,727 | B1 | * | 9/2001 | Lindahl .................. A61F 9/025 2/428 |
| 7,260,850 | B2 | * | 8/2007 | Ambuske ............... A42B 3/185 2/10 |
| 7,648,233 | B2 | * | 1/2010 | Blanshay ................ A61F 9/026 351/47 |
| 7,908,667 | B2 | * | 3/2011 | Rogers .................... A42B 3/04 2/6.2 |
| 8,028,344 | B2 | * | 10/2011 | Rogers .................. A42B 3/166 2/6.2 |
| 9,381,118 | B1 | * | 7/2016 | Connelly ............... A61F 9/026 |
| 9,504,287 | B1 | * | 11/2016 | Guffin, III ............. A61F 9/026 |
| 9,655,783 | B2 | * | 5/2017 | McNeal .................. A61F 9/027 |
| D818,030 | S | * | 5/2018 | Hanudel .................... D16/312 |
| D856,406 | S | * | 8/2019 | Hanudel .................... D16/312 |
| D874,556 | S | * | 2/2020 | Hanudel .................... D16/339 |
| 10,702,417 | B2 | * | 7/2020 | Chen ...................... A63B 33/00 |
| 2003/0035082 | A1 | * | 2/2003 | Olney .................... G02C 11/08 351/62 |
| 2003/0221246 | A1 | * | 12/2003 | Schary .................... A61F 9/027 2/453 |
| 2005/0183190 | A1 | * | 8/2005 | Hussey .................. A42B 3/185 2/424 |
| 2009/0049585 | A1 | | 2/2009 | Borsa et al. |
| 2010/0012692 | A1 | * | 1/2010 | Harris ...................... A42B 3/04 224/181 |
| 2011/0072564 | A1 | | 3/2011 | Krauter |
| 2011/0265237 | A1 | * | 11/2011 | Lazar ..................... A42B 3/185 2/10 |
| 2012/0117717 | A1 | | 5/2012 | McGinn et al. |
| 2012/0180202 | A1 | * | 7/2012 | McNeal ................. A42B 3/185 2/422 |
| 2012/0180203 | A1 | * | 7/2012 | Giroux .................... A61F 9/027 2/422 |
| 2015/0026872 | A1 | * | 1/2015 | Giroux Bernier ..... A42B 3/042 2/422 |
| 2015/0089726 | A1 | | 4/2015 | Long |
| 2015/0128385 | A1 | * | 5/2015 | Kuo ........................ A61F 9/027 24/193 |
| 2015/0245682 | A1 | * | 9/2015 | McGinn ................. A42B 3/205 2/422 |
| 2015/0313306 | A1 | * | 11/2015 | Lamanna ............... A42B 3/228 2/6.3 |
| 2016/0007670 | A1 | * | 1/2016 | Connelly ........... A41D 13/0568 2/421 |
| 2016/0088891 | A1 | | 3/2016 | Walsh et al. |
| 2017/0265557 | A1 | * | 9/2017 | Mercado, Jr. ............ A42B 3/16 |
| 2017/0319878 | A1 | * | 11/2017 | Vanneste ............... A62B 17/001 |
| 2018/0206582 | A1 | * | 7/2018 | Handfield .............. A42B 3/185 |
| 2019/0000674 | A1 | * | 1/2019 | Bouchard Fortin ... A42B 3/042 |
| 2019/0365009 | A1 | * | 12/2019 | Frieder, III .............. G02C 3/02 |

FOREIGN PATENT DOCUMENTS

| | | |
|---|---|---|
| EP | 3568032 A1 | 11/2019 |
| WO | 2018132777 A1 | 7/2018 |

OTHER PUBLICATIONS

International Search Report for International Application No. PCT/US2018/013676 dated Apr. 4, 2018, 2 pages.

Written Opinion for International Application No. PCT/US2018/013676 dated Apr. 4, 2018, 6 pages.

European Extended Search Report dated Sep. 2, 2020 for European Patent Application No. 18738615, 8 pages.

Canadian Office Action dated Jul. 28, 2020 for Canadian Patent Application No. 3,049,773, 3 pages.

* cited by examiner

HELMET MOUNTED VISOR

CROSS REFERENCE TO RELATED APPLICATIONS

This application is a 371 of International Application No. PCT/US2018/013676 filed on Jan. 13, 2018, which claims priority to and the benefit of U.S. Provisional Patent Application No. 62/445,757 filed Jan. 13, 2017, each of which is incorporated by reference herein in its entirety.

FIELD OF THE INVENTION

The present invention, according to some embodiments, relates to a visor that may be mounted onto a helmet or other head protection device.

SUMMARY OF THE INVENTION

In some embodiments, a visor system for a helmet includes a lens sized to extend across at least a portion of a user's face, a frame secured along a top portion of the lens and configured to receive and abut against a front surface of the helmet, a first fastener coupled to a first end of the frame by a first flexible attachment, and a second fastener coupled to a second end of the frame by a second flexible attachment. In some embodiments, the visor system further includes a first anchor releasably securable to the first fastener, the first anchor being mountable onto a first portion of the helmet, and a second anchor releasably securable to the second fastener, the second anchor being mountable onto a second portion of the helmet.

In some embodiments, the first flexible attachment comprises a first elastic cord and the second flexible attachment comprises a second elastic cord. In some embodiments, the first elastic cord is received through a hole positioned at the first end of the frame, and the second elastic cord is received through a hole positioned at the second end of the frame. In some embodiments, the first elastic cord forms a first loop and the second elastic cord forms a second loop. In yet further embodiments, an end of the first elastic cord is secured to the first fastener, and an end of the second elastic cord is secured to the second fastener. In some embodiments, the first flexible attachment includes an end which is threaded through and movable with respect to the first fastener. In some embodiments, the second flexible attachment includes an end which is threaded through and movable with respect to the second fastener. In some embodiments, the end of the first flexible attachment and/or the second flexible attachment may be moved to adjust a tension of the visor system against the helmet during use. In some embodiments, each of the first fastener and the second fastener includes a strap having a hook or loop patch. In some embodiments, each of the first fastener and the second fastener includes a slot through which the strap passes.

In some embodiments, the first anchor comprises a first hook defining a groove for receiving the first fastener, and the second anchor comprises a second hook defining a groove for receiving the second fastener. In some embodiments, the first fastener includes an indent for receiving a portion of the first hook when the first fastener is received in the groove defined by the first hook, and the second fastener includes an indent for receiving a portion of the second hook when the second fastener is received in the groove defined by the second hook. In further embodiments, the first anchor is mountable onto a first rail positioned on the first portion of the helmet and the second anchor is mountable onto a second rail positioned on the second portion of the helmet. In certain embodiments, the first anchor is mountable at a plurality of positions along the first rail, and the second anchor is mountable at a plurality of positions along the second rail.

In some embodiments, the lens does not protrude beyond the front surface of the helmet when the visor system is mounted onto the helmet. In some embodiments, the visor system further includes a seal positioned along at least a bottom edge and/or a side edge of the lens, the seal configured to abut against the user's face during use. In some embodiments, the seal comprises a groove for receiving an edge of the lens. In some embodiments, the seal further includes a pull tab for separating the seal from the lens.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention can be embodied in different forms and thus should not be construed as being limited to the embodiments set forth herein.

DETAILED DESCRIPTION

Figure 1A:
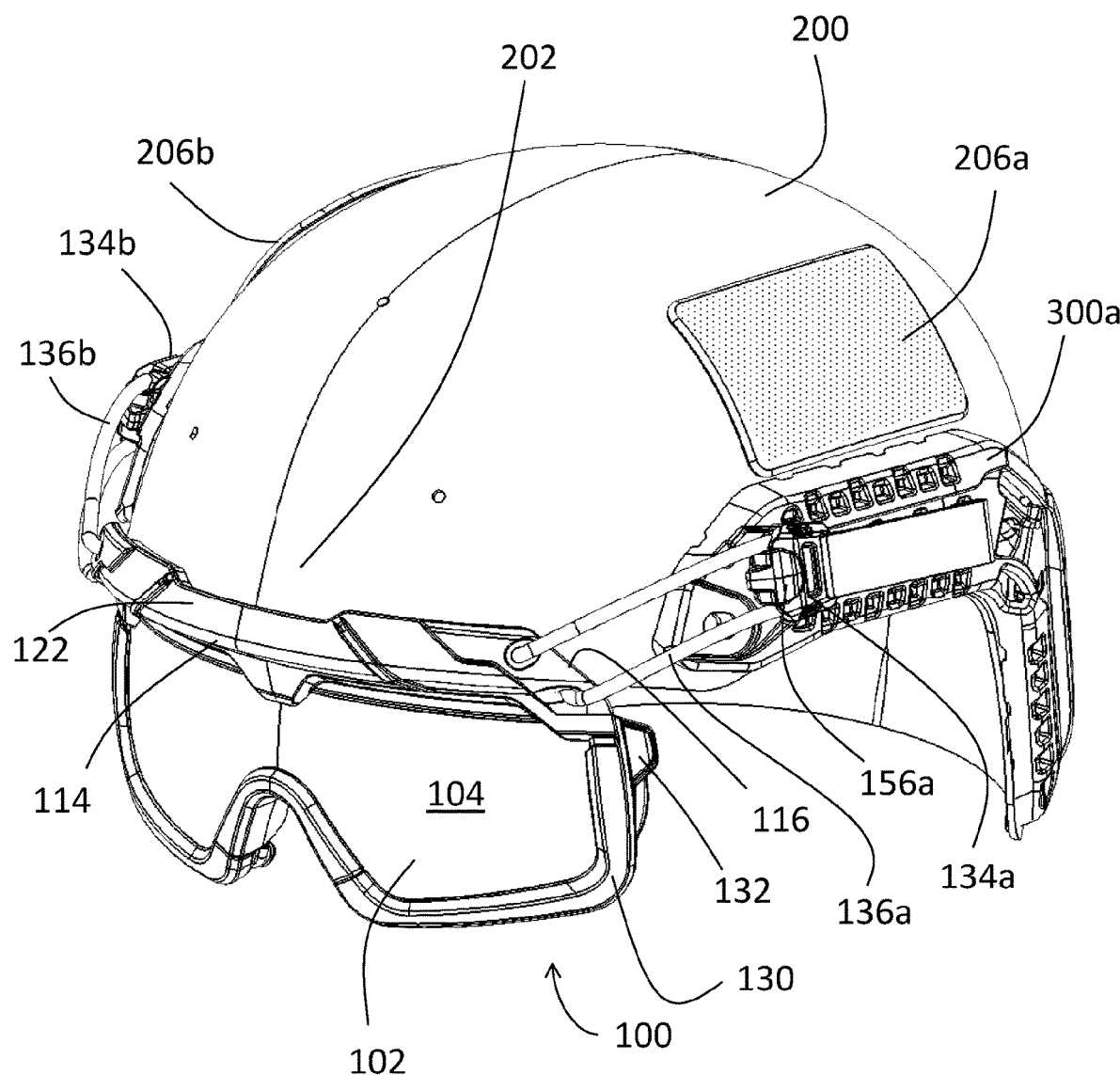
FIG. 1A is a front perspective view of a visor system invention mounted on a helmet according to an embodiment of the present.

The present subject matter will now be described more fully hereinafter with reference to the accompanying Figures, in which representative embodiments are shown. The present subject matter can, however, be embodied in different forms and should not be construed as limited to the embodiments set forth herein. Rather, these embodiments are provided to describe and enable one of skill in the art. All publications, patent applications, patents, and other references mentioned herein are incorporated by reference in their entirety.

Referring to the drawings in detail, wherein like reference numerals indicate like elements throughout, there is shown in FIGS. 1-12 a visor system generally designated 100, in accordance with an exemplary embodiment of the present invention. With particular reference to FIGS. 1A-1D, in certain preferred embodiments of the present invention, visor system 100 is configured to be mounted to a head protection device, such as helmet 200. Helmet 200 may be any type of head protection helmet known in the art, for example, those used for sporting, police, or military purposes. In certain embodiments, helmet 200 is a standard infantry ballistic helmet or an advanced combat helmet (ACH). In other embodiments, helmet 200 may be a modular integrated communications helmet (MICH), a tactical ballistic helmet (TBH), a lightweight marine helmet, police general duty helmet, or a personnel armor system for ground troops (PASGT) helmet.

In some embodiments, visor system 100 includes a lens 102 which is sized and configured to extend across at least a portion of a user's face during use when mounted to helmet 200. For example, lens 102 is preferably sized to at least cover a user's eyes according to some embodiments when used in a closed position. In some embodiments, lens 102 is sized to cover the top half of a user's face during use. In further embodiments, lens 102 is sized to extend over at least a user's eyes during use. In some embodiments, lens 102 is configured to protect a user's eyes from ballistic projectiles, shrapnel, and/or other objects. In further embodiments, lens 102 may be configured to protect the user's eyes from chemicals or environmental conditions (e.g., wind, dust, rain, etc.). While lens 102 is depicted in the appended Figures as a single lens which is sized to cover both eyes of a user, it should be understood that in other embodiments lens 102 could include two separate lenses, one for each eye of the user.

In some embodiments, lens 102 includes a front surface 104 and a back surface 106. Front surface 104 is intended to face away from the user's face during use and may be convexly curved as shown, for example, in FIG. 1A. Back surface 106 of lens 102 is opposite of front surface 104 and may be concavely curved as shown, for example, in FIG. 2B. In other embodiments, front surface 104 and/or back surface 106 may be planar or substantially planar. Front surface 104 and/or back surface 106 may have other contours according to further embodiments. As best shown in the exploded view of FIG. 3, lens 102 according to certain embodiments further includes a top edge 108, a bottom edge 110 opposite top edge 108, and side edges 112 extending between top edge 108 and bottom edge 110. Bottom edge 110 may include a cutout sized and shaped to fit on or around the user's nose during use.

Lens 102 is preferably transparent, or at least partially transparent, and may be made from any material suitable for eye and/or face protection known in the art. Lens 102 in some embodiments is made from glass. In other embodiments, lens 102 may be made from a polymer or plastic such as polycarbonate. In yet other embodiments, lens 102 may be fabricated from a laminate or composite material. Lens 102 may also be tinted or colored according to some embodiments, or configured to protect the user's eyes from damage from specific visible and invisible wavelengths of light (e.g., UV-light or laser light). Furthermore, front surface 104 and/or back surface 106 may be provided with one or more coatings (e.g., scratch-resistant coatings, dirt-resistant coatings, anti-glare coatings, anti-reflective coatings, anti-fogging coatings, hydrophobic coatings, polarizing films, etc.).

In certain embodiments, visor system 100 is configured to be mounted onto helmet 200 such that lens 102 does not protrude beyond or in front of front portion 202 of helmet 200 during use. Front portion 202 of helmet 200 corresponds to the portion of helmet 200 which is configured to cover the user's forehead during use according to some embodiments. In some embodiments, lens 102 is positioned below or behind the front portion 202 of helmet 200 when visor system 100 is mounted onto helmet 200 during use, as shown for example in FIGS. 1C and 1D. By placing lens 102 closer to the user's face according to some such embodiments, clearance is provided to allow positioning of additional equipment in front of lens 102, for example, night vision goggles, cameras, etc., which may also be mounted onto helmet 200. Moreover, in some embodiments, positioning lens 102 closer to the user's face reduces the gap through which unwanted material can get between lens 102 and the user's face.

In some embodiments visor system 100 includes a frame 114 coupled to lens 102. Frame 114 may include a body which is constructed from rigid or substantially rigid plastic, metal, carbon fiber, or any other material known in the art suitable for supporting lens 102. In some embodiments, the body of frame 114 may be of a one-piece construction (monolithic), and may be made, for example, by molding, machining, or additive manufacturing (e.g., 3-D printing). In some embodiments, frame 114 includes one or more cavities or cutouts which are provided to lessen the weight of frame 114.

Frame 114 according to some embodiments is positioned along a top portion of lens 102. In some embodiments, frame 114 is positioned on or along top edge 108 of lens 102. In some embodiments, the body of frame 114 extends from a first end 116 to a second end 118. In some embodiments, frame 114 is positioned against front surface 104 of lens 102. In other embodiments, frame 114 may be positioned against back surface 106 of lens 102. In some embodiments, frame 114 is curved to match a curvature of lens 102. While the illustrated embodiments show frame 114 partially surrounding lens 102 (e.g., along top edge 108), it should be understood that frame 114 may completely surround the perimeter of lens 102 in other embodiments. In some embodiments, frame 114 extends along at least the entire length of top edge 108 of lens 102.

Figure 1B:
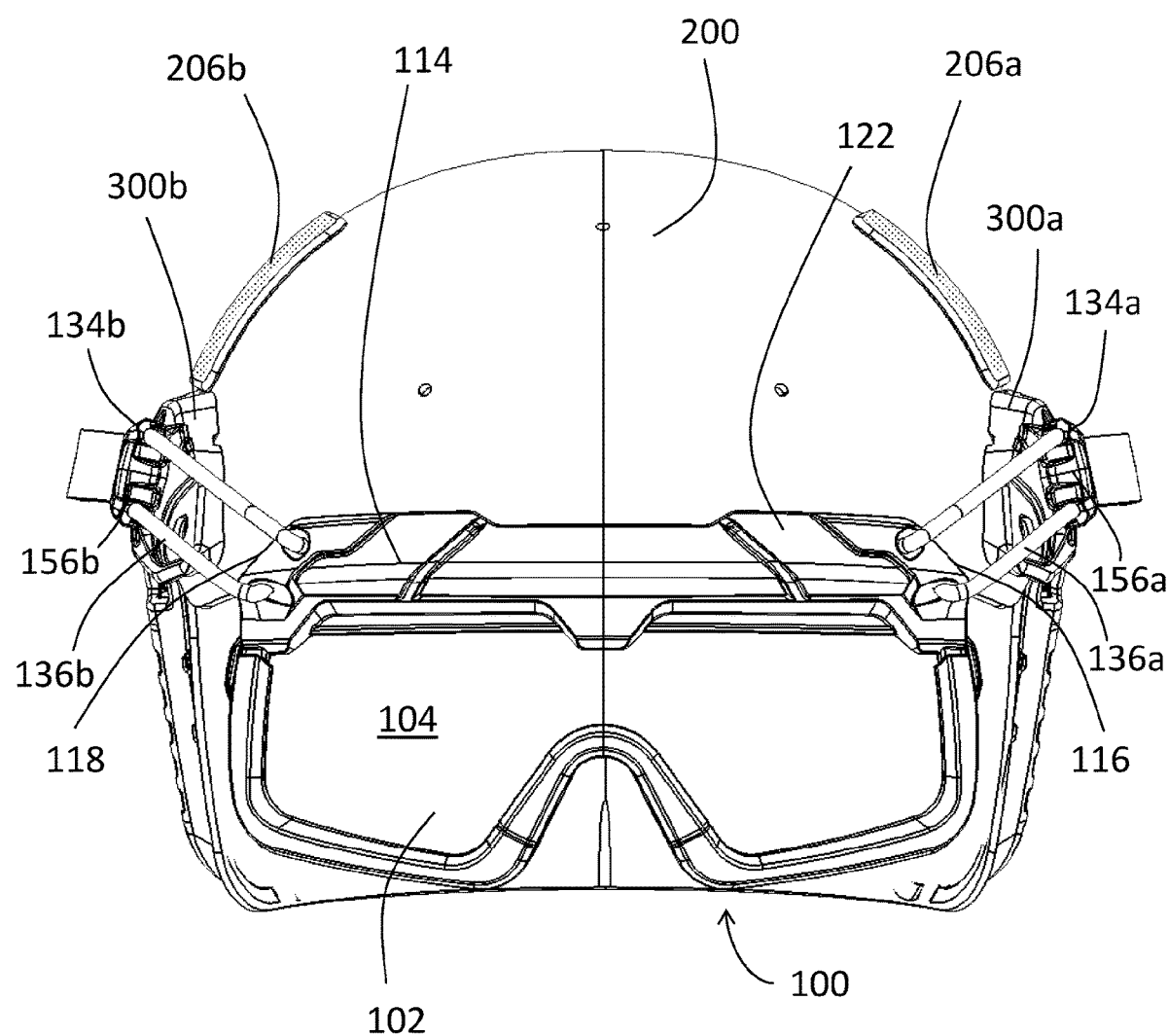
FIG. 1B is a front view of the visor system and helmet of FIG. 1A.
Figure 1C:
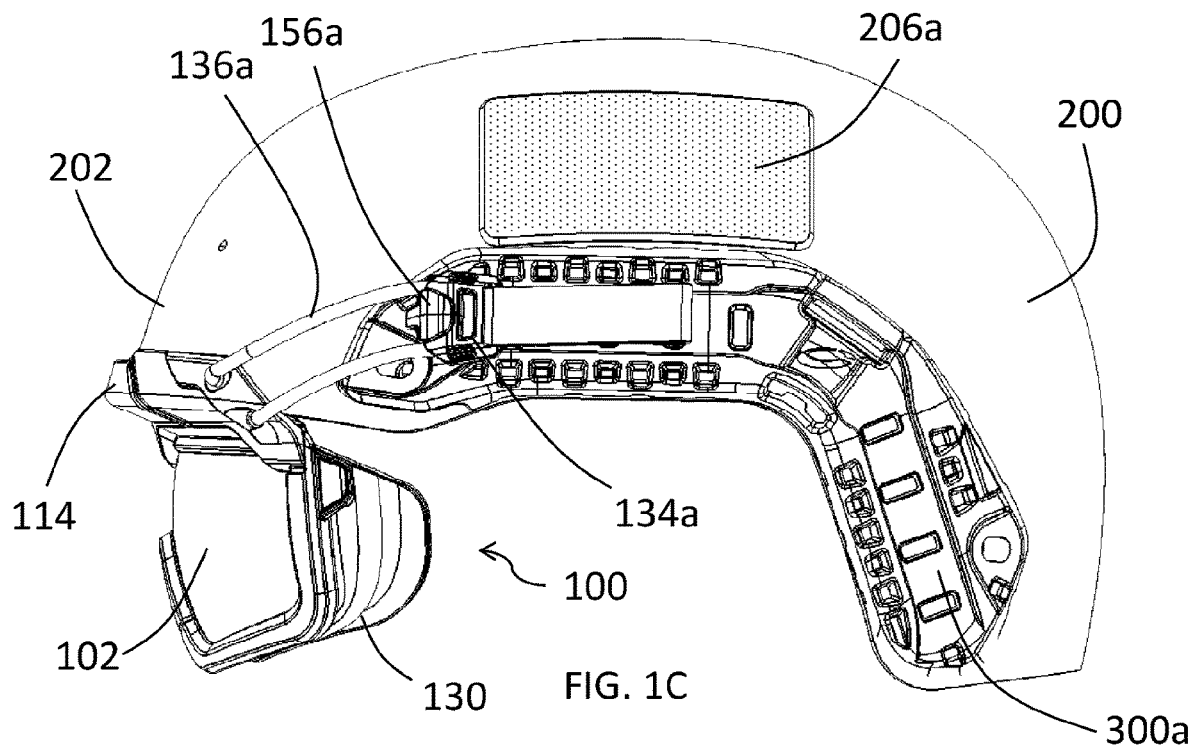
FIG. 1C is a side view of the visor system and helmet of FIG. 1A.
Figure 1D:
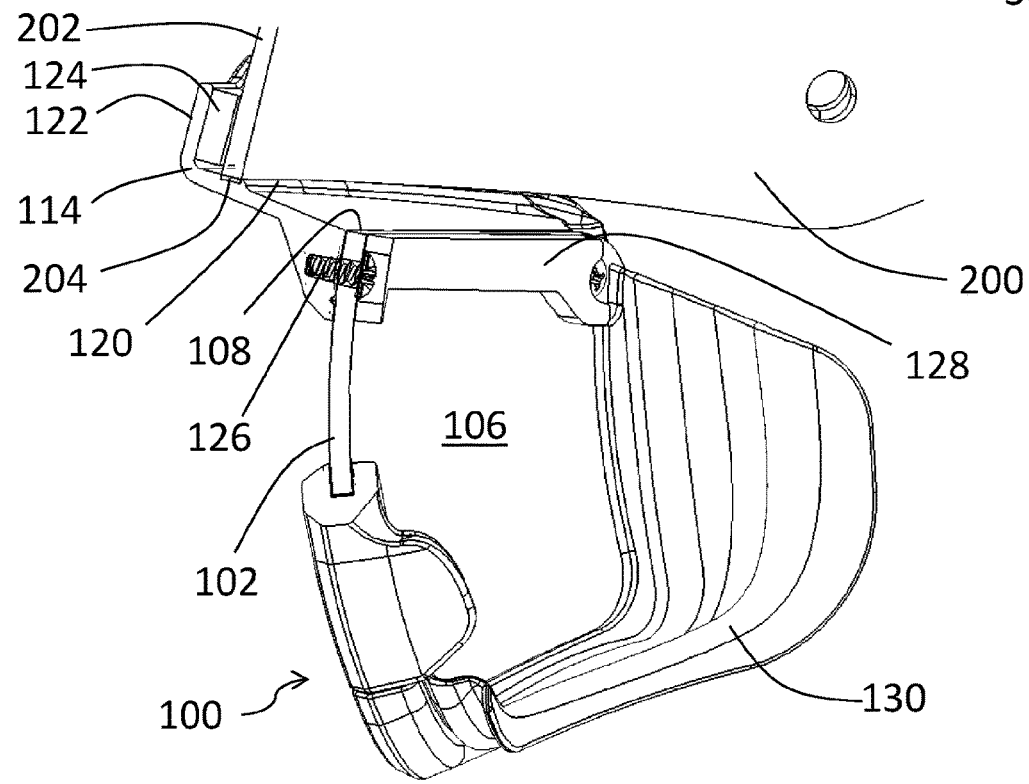
FIG. 1D is a partial cross-sectional view of the visor system and helmet of FIG. 1A.
Figure 2A:
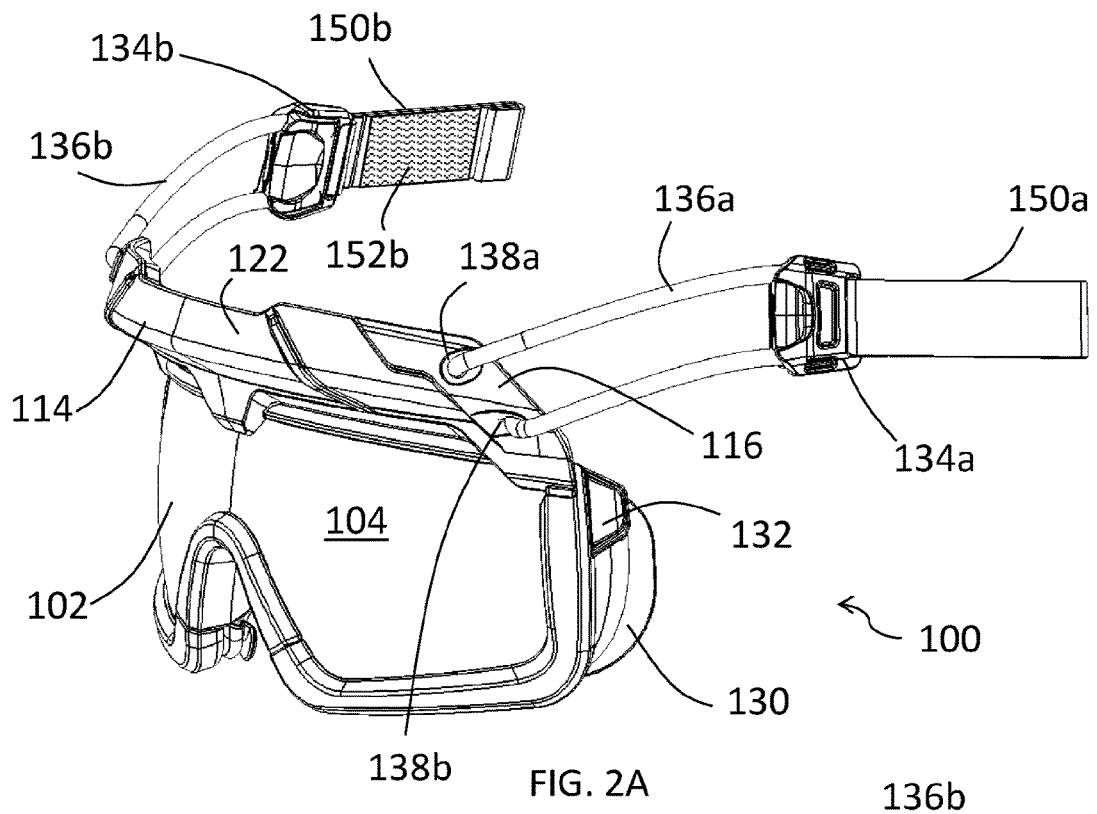
FIG. 2A is a front perspective view of the visor system of FIG. 1A separated from the helmet.
Figure 2B:
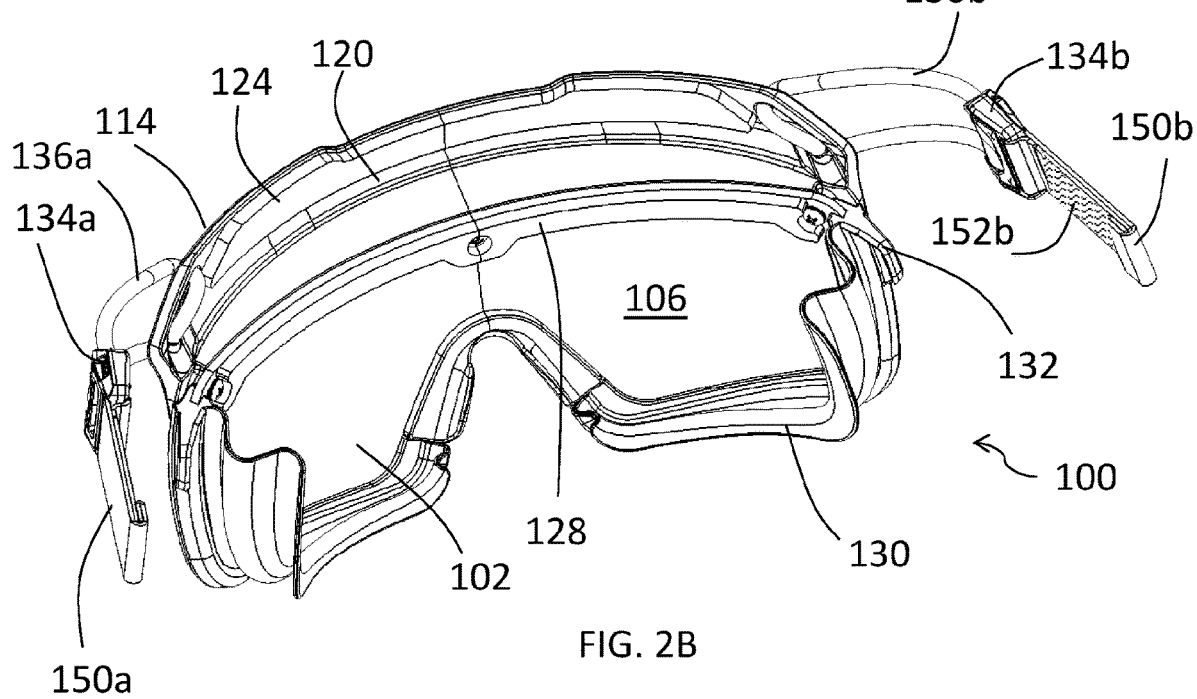
FIG. 2B is a rear perspective view of the visor system of FIG. 2A.
Figure 2C:
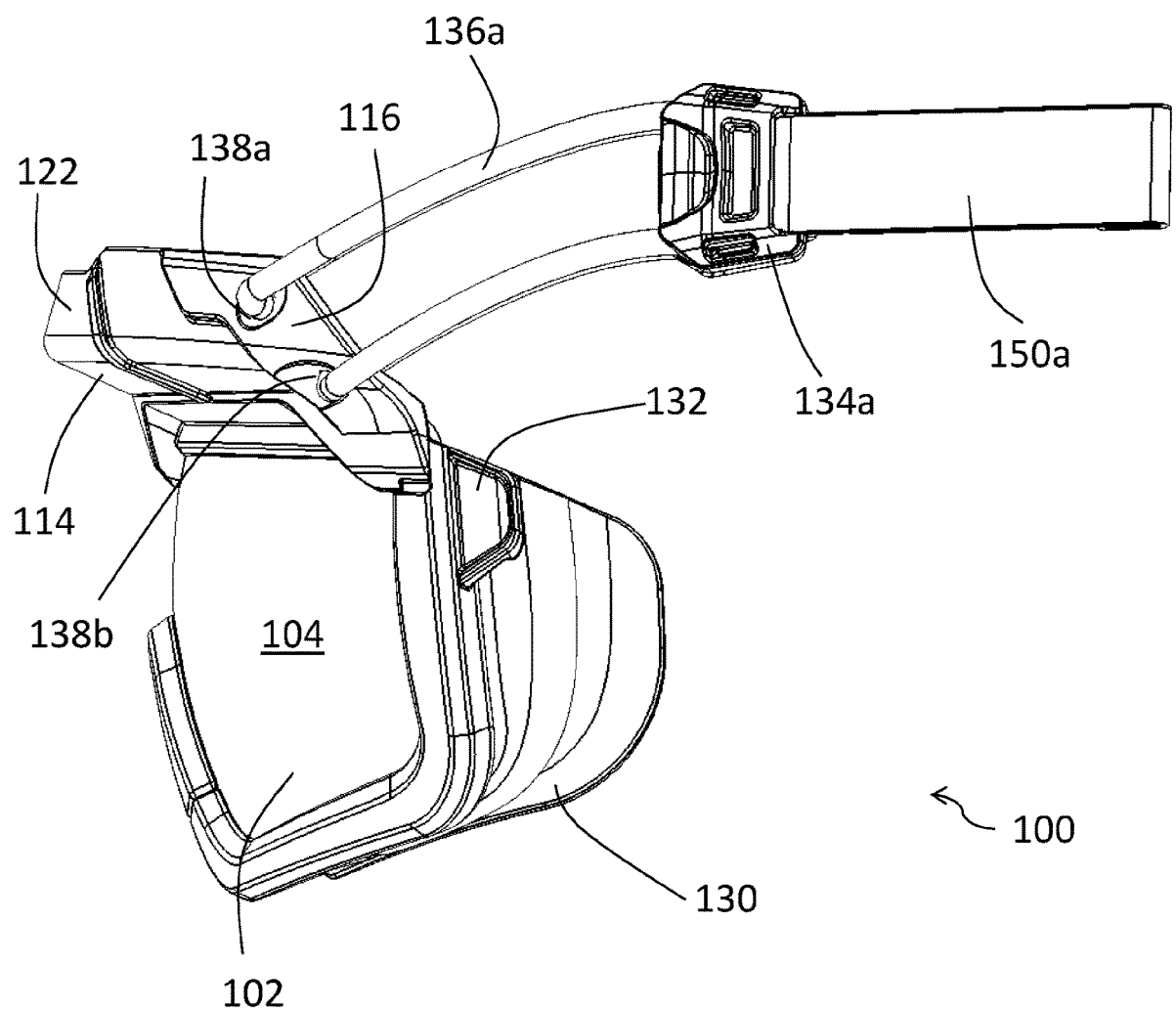
FIG. 2C is a side view of the visor system of FIG. 2A.
Figure 3:
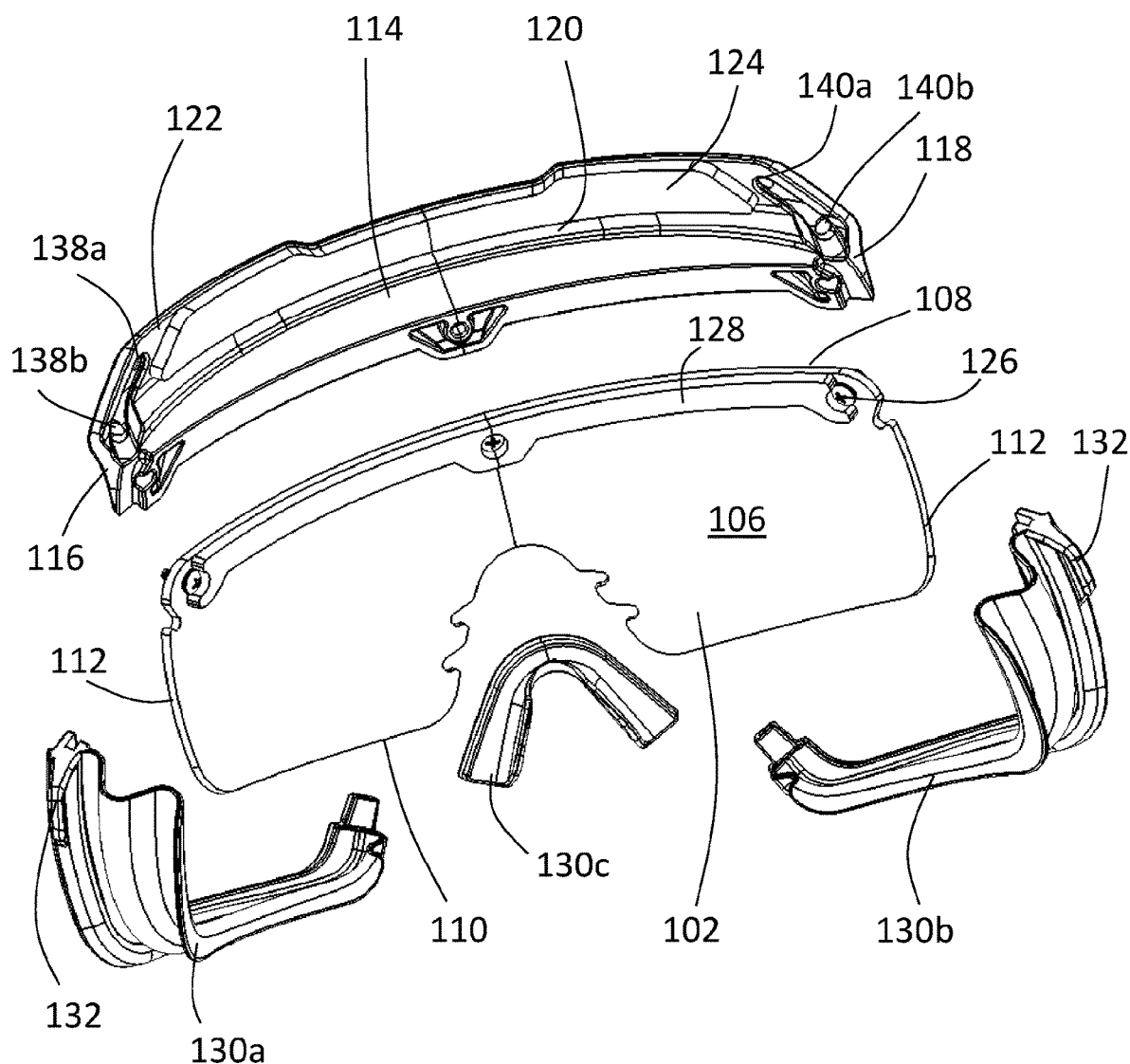
FIG. 3 is a rear exploded view of the lens, frame, and seals of the visor system according to an embodiment of the present invention.
Figure 4A:
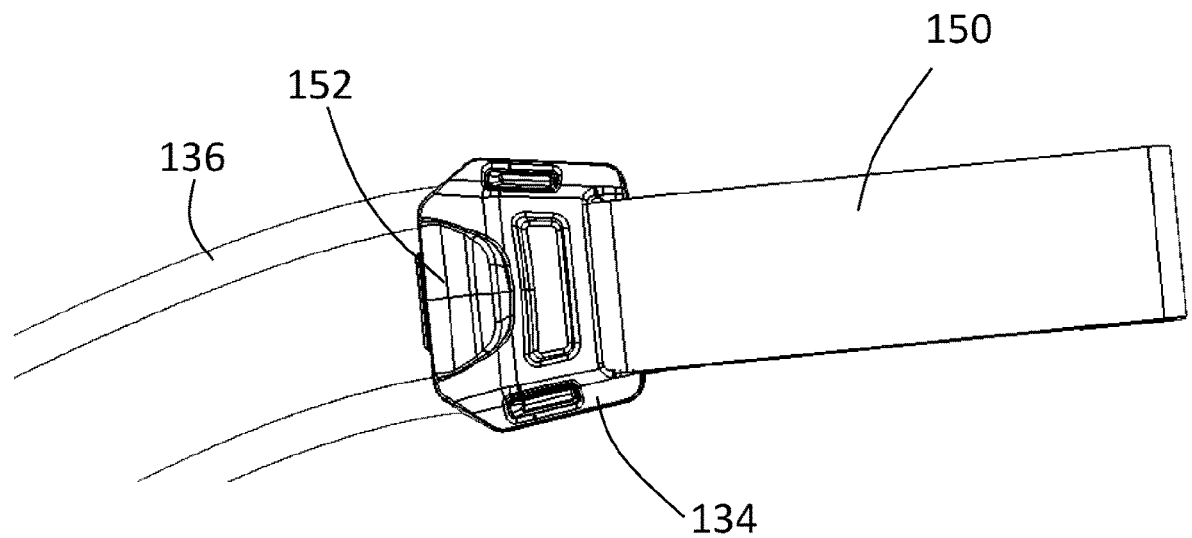
FIGS. 4A and 4B are first and second side views of a fastener of the visor system with a strap according to an embodiment of the present invention.
Figure 4B:
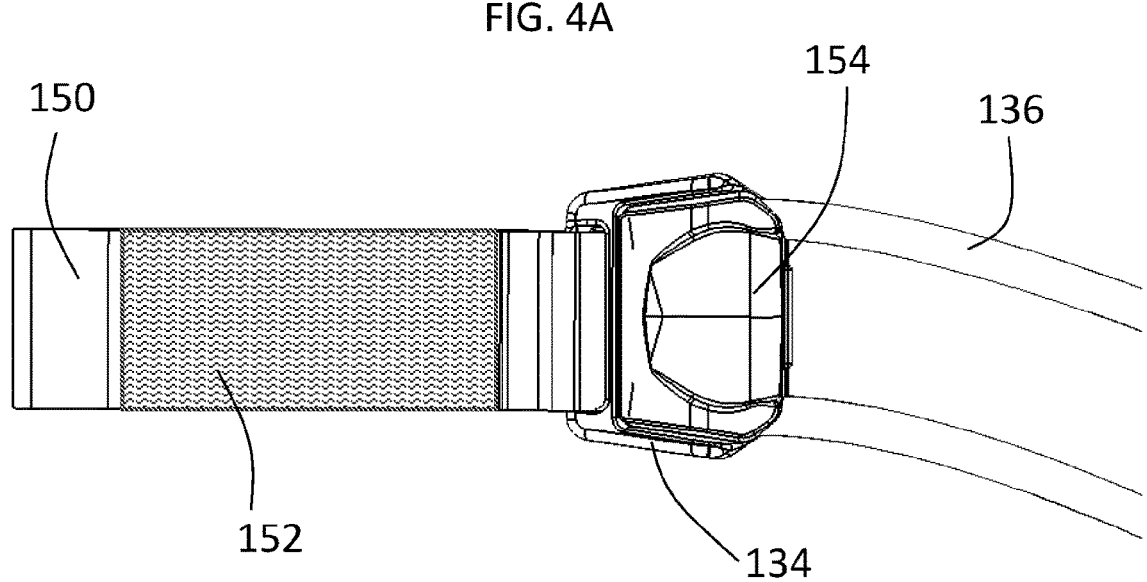

In some embodiments, frame 114 is configured to receive and abut against front portion 202 of helmet 200 when visor system 100 is mounted onto helmet 200. In some embodiments, frame 114 may have a curvature which generally matches an exterior curvature of front portion 202 of helmet 200. As shown in FIGS. 1D, 2B and 3, in some embodiments, frame 114 includes a stepped portion 120 which is shaped and configured to abut against bottom edge 204 of front portion 202 of helmet 200. Stepped portion 120 may be configured to be positioned above and in front of lens 102 during use. In further embodiments, frame 114 further includes a lip 122 which extends in front of an exterior surface of front portion 202. In some embodiments, a back surface of lip 122 is configured to abut against the exterior surface of front portion 202. In further embodiments, frame 114 may include a spacer 124 which is configured to be positioned between lip 122 and the exterior surface of front portion 202. Spacer 124, in some embodiments, is configured to abut against lip 122 and the exterior surface of front portion 202. In some embodiments, spacer 124 may be attached to and extend from the back surface of lip 122. In some embodiments, spacer 124 may be made of a soft or resilient material in some embodiments, for example, foam, elastomer, silicone, rubber, gel, etc. In some embodiments, frame 114 and/or lens 102 is configured to be held against front portion 202 and/or bottom edge 204 of helmet 200 when visor system 100 is mounted onto helmet 200 without being directly attached to front portion 202 and/or bottom edge 204 of helmet 200. In alternative embodiments, frame 114 and/or lens 102 may be directly attached to helmet 200 using, for example, clips or other mechanical fasteners.

In some embodiments, frame 114 is secured to lens 102 using any suitable means known in the art. In some embodiments, frame 114 may be secured to lens 102 using one or more fasteners (e.g., screws 126) as shown in FIG. 1D. In some embodiments, lens 102 may further include one or more fastener holes, e.g., positioned along or proximate top edge 108, which are configured to receive the one or more fasteners. In further embodiments, lens 102 may be sandwiched between frame 114 and a backing 128 which is positioned against back surface 106 along or proximate to top edge 108. In other embodiments, frame 114 may be secured to lens 102 using other mechanical fasteners, adhesives, plastic welding, injection molding techniques, etc.

In some embodiments, visor system 100 further includes a seal 130 which is positioned along at least bottom edge 110 and/or side edges 112 of lens 102. In some embodiments, seal 130 is configured to extend from lens 102 and abut against the user's face during use in order to prevent or reduce the chance of unwanted material from entering the space between lens 102 and the user's face. In some embodiments, seal 130 includes a flexible skirt which is configured to extend toward and abut against the user's face during use. Seal 130, or at least portions thereof, may be made from a soft or resilient material, for example, foam, elastomer, silicone, rubber, gel, etc. In some embodiments, seal 130 may be a single component which extends along bottom edge 110 and/or side edges 112. In other embodiments, as shown in FIG. 3, seal 130 may include two or more separate components 130a, 130b, 130c which are each configured to be positioned along different portions of bottom edge 110 and side edges 112. For example, seal 130 may include a left seal 130a, a right seal 130b, and a center seal 130c which is shaped to fit around the user's nose. In some embodiments, center seal 130c may be made from a different material than left and right seals 130a, 130b. In some embodiments, seal 130, or each component 130a, 130b, 130c of seal 130, includes a groove which is sized and configured to receive bottom edge 110 and/or side edges 112 of lens 102. In some embodiments, lens 102 is frictionally secured to seal 130 within the groove of seal 130. In other embodiments, seal 130 may be attached to lens 102 using an adhesive. In yet further embodiments, seal 130 is configured to be removed from lens 102 by the user without having to first remove helmet 200 from the user's head or without having to detach visor system 100 from helmet 200. This may be desirable in certain circumstances where access to the user's eye(s) is needed without compromising the protection provided by lens 102 and/or helmet 200. In some embodiments, seal 130 or a portion of seal 130 (e.g., 130a, 130b) may be separated from lens 102 simply by peeling or pulling seal 130, or the portion thereof, off of lens 102. Preferably seal 130 or the portion thereof may be removed single-handedly by the user and without the use of any tools. In some embodiments, left seal 130a and/or right seal 130b may include a pull tab 132 which can be grasped and pulled by the user to facilitate separation from lens 102.

Referring particularly to FIGS. 1A-2C, visor system 100 according to some embodiments includes a first fastener 134a and a second fastener 134b which are configured to removably secure visor system 100 to helmet 200. In some embodiments, first fastener 134a and second fastener 134b are configured to respectively engage with first and second anchors 156a, 156b secured at different locations on helmet 200 (e.g., left and right sides of helmet 200), as will be described further herein. In certain embodiments, visor system 100 is secured to helmet 200 using only first and second fasteners 134a, 134b. In alternative embodiments, visor system 100 may include other fasteners that are configured to secure visor system 100 to helmet 200. In some embodiments, first fastener 134a is coupled to frame 114 at or proximate to first end 116 and second fastener 134b is coupled to frame 114 at or proximate to second end 118. Alternatively, first and second fasteners 134a and 134b may be coupled to lens 102 and/or backing 128 instead of frame 114. In some embodiments, first fastener 134a is coupled to frame 114 by a first flexible attachment 136a, and second fastener 134a is coupled to frame 114 by a second flexible attachment 136b. In some embodiments, first and second flexible attachments 136a, 136b are elastic and may each include, for example, an elastic cord (e.g., a bungee cord), elastic band, or elastic strap. In some embodiments, first flexible attachment 136a is formed into a first loop, and second flexible attachment 136b is formed into a second loop. In some embodiments, frame 114 may include one or more holes 138a, 138b through which first and second flexible attachments 136a, 136b are received to secure frame 114 to first and second flexible attachments 136a, 136b. For example, as shown in the illustrated embodiments, first end 116 of frame 114 may include a pair of holes through which first flexible attachment 136a is looped. Likewise, second end 118 of frame 114 may include a pair of holes 140a, 140b through which second flexible attachment 136b is looped. At least holes 138a and 140a, in some embodiments, may be positioned on lip 122 of frame 114. In some embodiments, spacer 124 may be positioned generally between holes 138a and 140a. In some embodiments, the ends of first flexible attachment 136a are secured to first fastener 134a and the ends of second flexible attachment 136b are secured to second fastener 134b to form separate loops.

It should be appreciated that in other embodiments each flexible attachment 136 need not be in the form of a loop made from a single elastic cord or strap. Alternatively, for example, each flexible attachment 136 may include two or more separate elastic cords or straps which can be arranged in parallel. According to some of these alternative embodiments, a first end of the elastic cords or straps may be attached to frame 114, and a second end of the cords or straps may be secured to a fastener 134.

Figure 5:
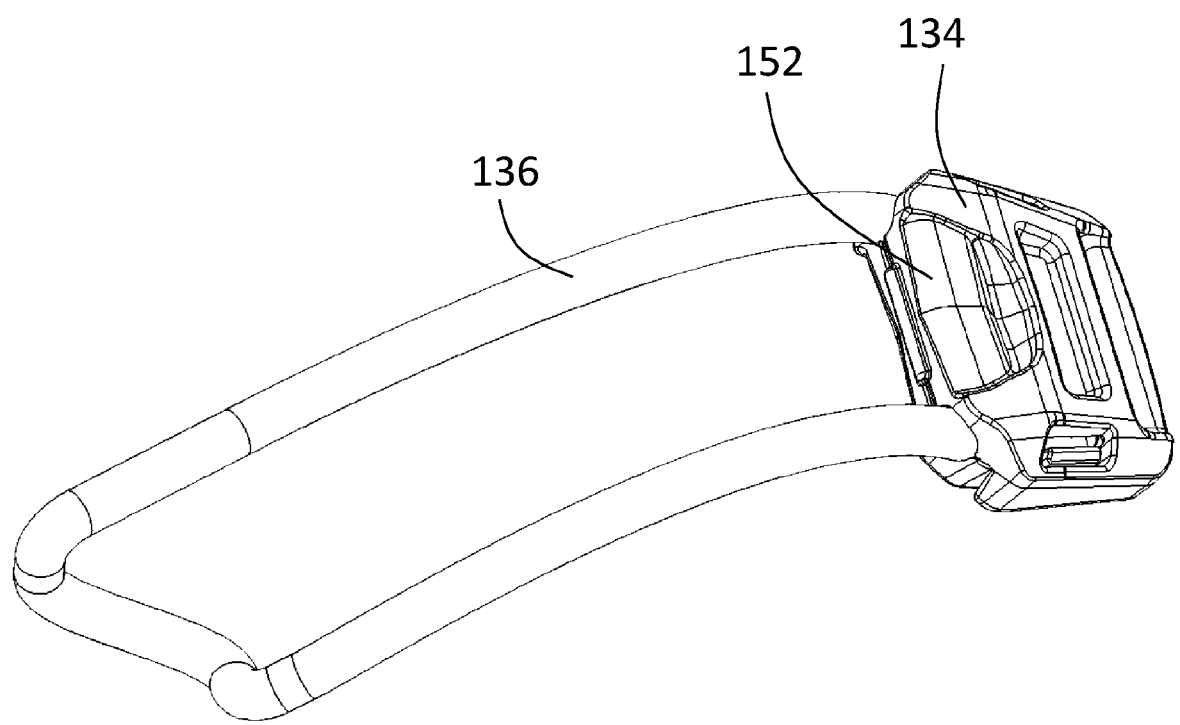
FIG. 5 is a perspective view of a fastener of the visor system coupled with a flexible attachment according to an embodiment of the present invention.
Figure 6A:
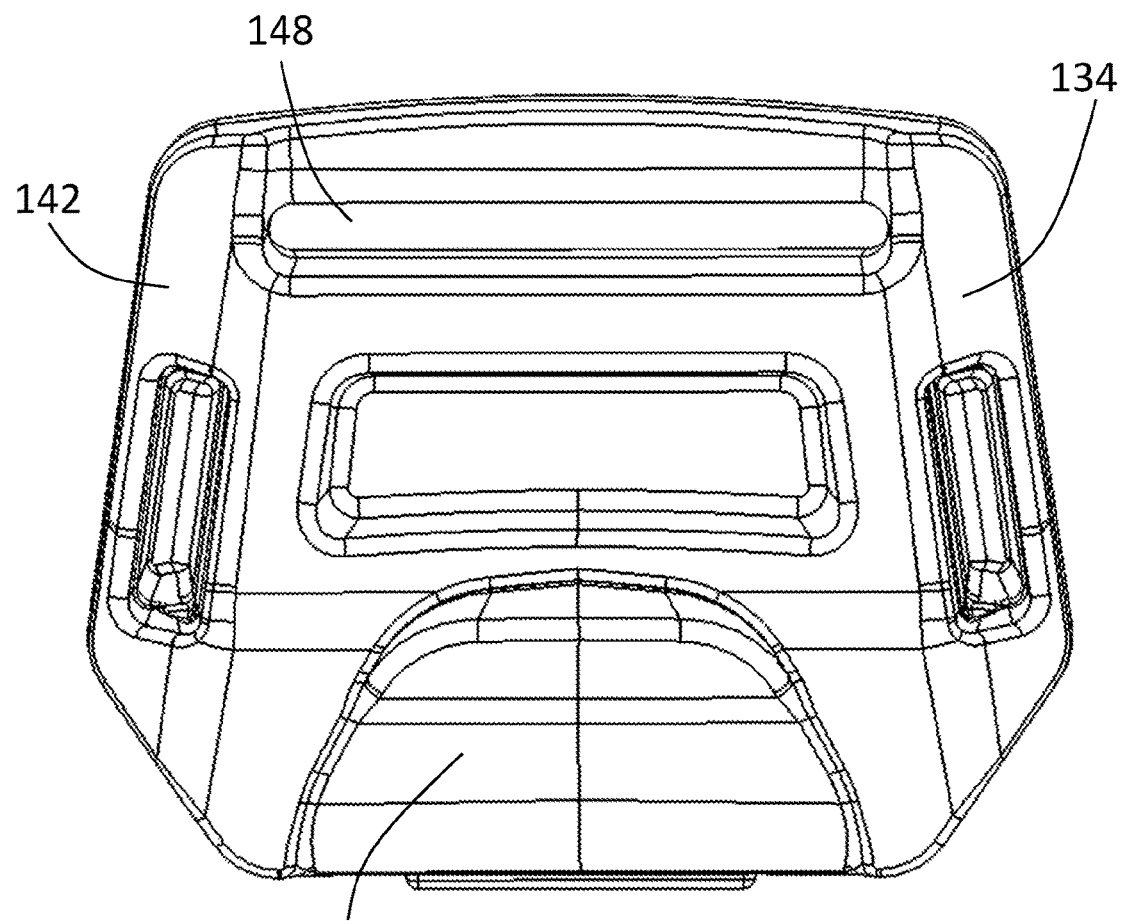
FIGS. 6A and 6B are side and front views of a fastener of the visor system according to an embodiment of the present invention.
Figure 6B:
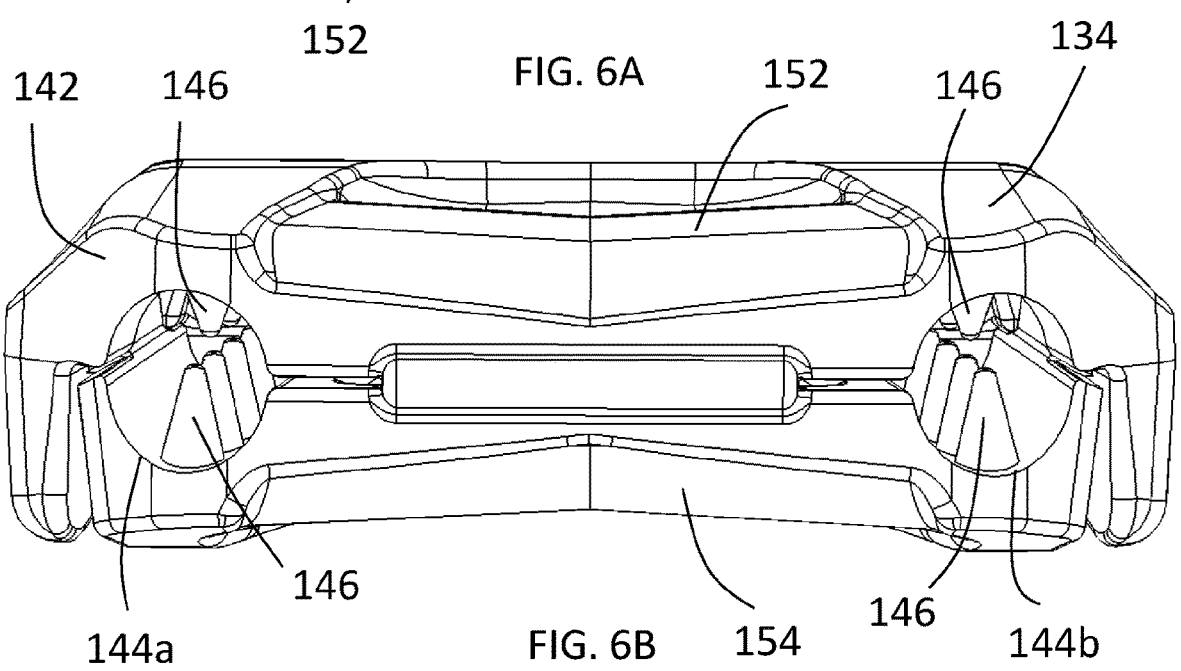

Further details of fastener 134, which may represent either first and/or second fastener 134a, 134b, can be seen in FIGS. 4A-6B. In some embodiments, fastener 134 includes a generally rigid housing 142 which may be constructed of, for example, of plastic, metal, carbon fiber, composites, or other suitable material. In some embodiments, housing 142 may be constructed as a single component or, in other embodiments, may be made from two or more components which are fit together. In some embodiments, housing 142 defines a first opening 144a for receiving a first end of flexible attachment 136, and a second opening 144b for receiving a second end of flexible attachment 136 to form a loop. FIG. 5 shows a fastener 134 and flexible attachment 136 arranged as a loop according to one such embodiment, with the remaining components of visor system 100 omitted for clarity. As can be best seen in FIG. 6B, first and second openings 144a, 144b may both be positioned on a front end of housing 142 according to some embodiments, and may open towards the same general direction. In certain embodiments, fastener 134 may further include one or more series of teeth 146 arranged within housing 142. In some embodiments, teeth 146 are configured to clamp onto the ends of flexible attachment 136 in order to secure the flexible attachment 136 to fastener 134. Other suitable methods for securing the flexible attachment 136 to fastener 134 may also be used in alternative embodiments. For example, the ends of flexible attachment may be tied, hooked, adhered, screwed, stapled, etc. to fastener 134 according to some embodiments.

Figure 12:
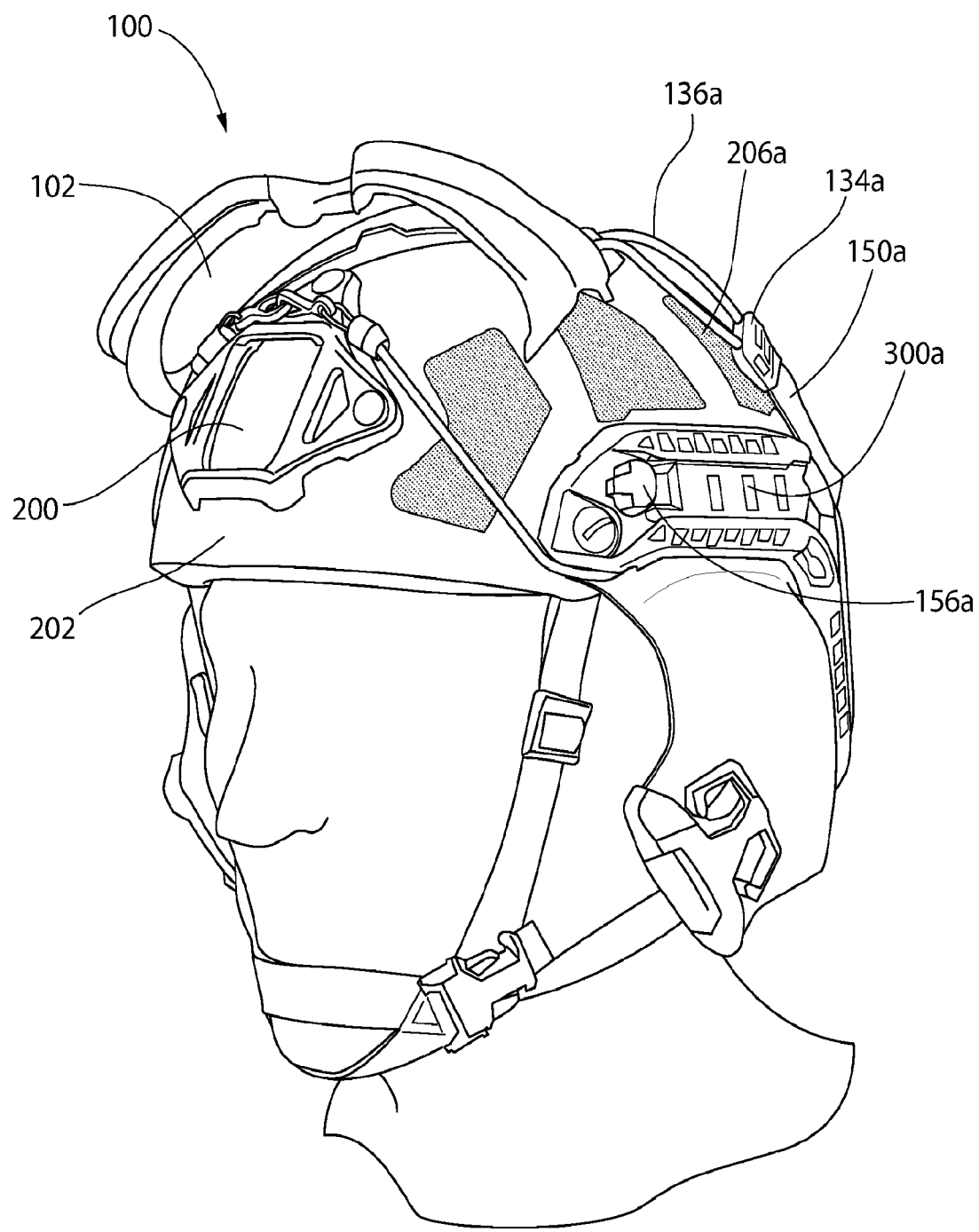
FIG. 12 is a perspective view showing the visor system in a stowage position atop the helmet according to a further embodiment of the present invention.

In further embodiments, fastener 134 may further include a pull strap 150 which may be sized and configured to be grasped by the user, for example, to help engage or disengage fastener 134 from anchor 156 as will be described further. In some embodiments, pull strap 150 may be made from a flexible material, for example nylon webbing, ripstop fabric, or other textile. Pull strap 150 may not be elastic according to some embodiments. In some embodiments, at least one side of pull strap 150 may include a hook or loop patch 152 (e.g., VELCRO® brand fastener patch) which is configured to removably fasten onto an opposite hook or loop patch. For example, as shown in FIGS. 1A-1C, in some embodiments, helmet 200 may be provided with one or more hook or loop patches 206a, 206b to which hook or loop patch 152a, 152b of pull straps 150a, 150b (FIGS. 2A, 2B) may be fastened when visor system 100 is not in use, allowing visor system 100 to be conveniently stowed atop helmet 200 (FIG. 12). Pull strap 150 may be secured to fastener 134 using any suitable methods. Referring again to FIG. 6A, in some embodiments, housing 142 defines slot 148 through which a pull strap 150 may be received or looped. Slot 148 may be positioned at or proximate a back end of housing 142 opposite the front end which includes openings 144a, 144b.

Figure 7:
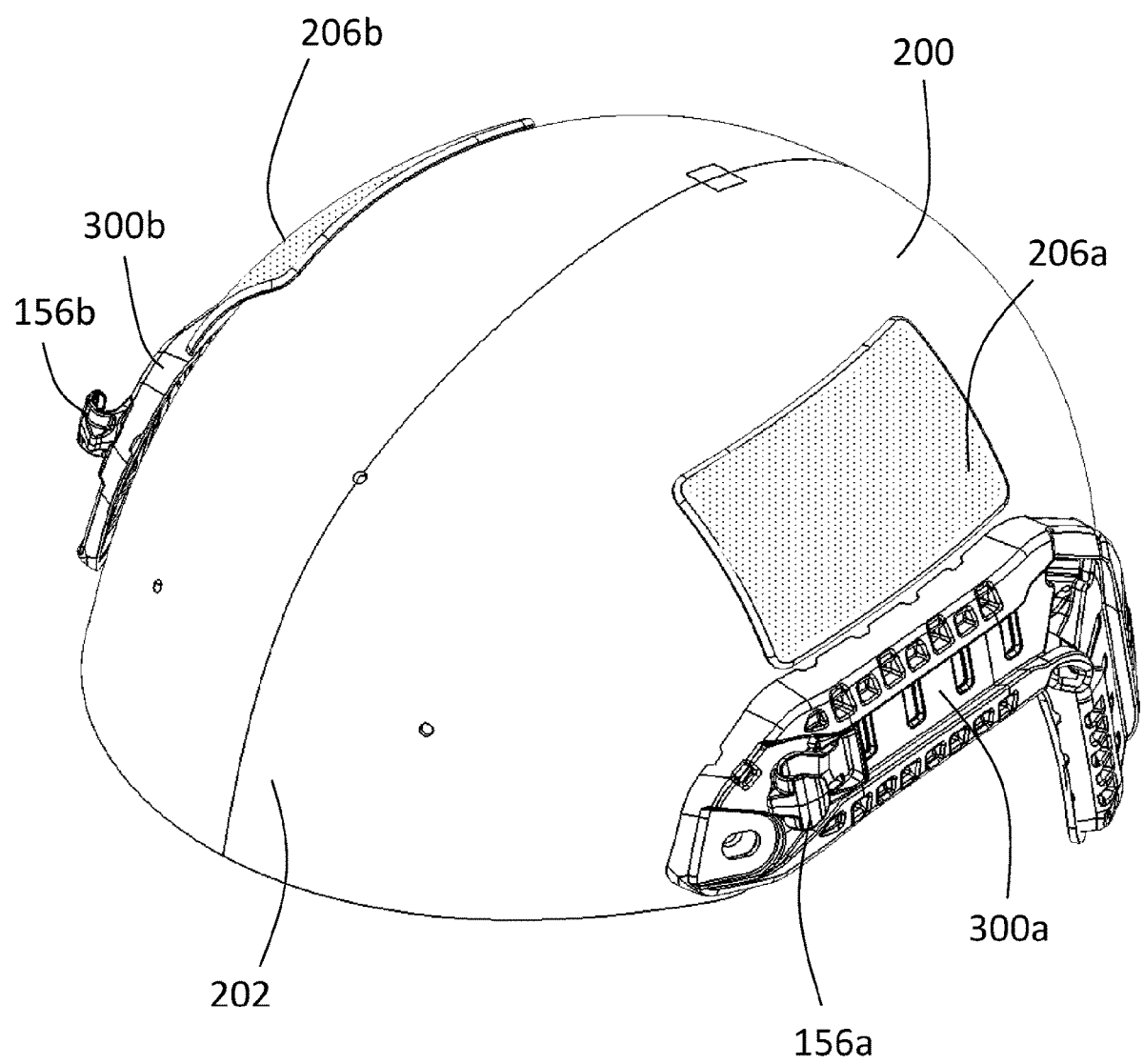
FIG. 7 is a perspective view showing anchors of the visor system mounted onto rails positioned on either sides of the helmet according to an embodiment of the present invention.

As described previously with reference to FIGS. 1A-1C, first fastener 134a and second fastener 134b are configured to respectively couple with first and second anchors 156a, 156b which are secured at different locations on the exterior of helmet 200. Referring particularly now to FIG. 7, first and second anchors 156a, 156b of visor system 100, in some embodiments, may be positioned on opposite sides of helmet 200, e.g., left and right sides of helmet 200. In some embodiments, first and second anchors 156a, 156b may be symmetrically positioned on the left and right sides of helmet 200, respectively, as shown in FIG. 1B. In some embodiments, first and second anchors 156a, 156b may be secured directly to helmet 200. In certain preferred embodiments, first and second anchors 156a, 156b are mountable onto first and second rails 300a, 300b that in turn are securable onto left and right sides of helmet 200. In some embodiments, first and second rails 300a, 300b may be symmetrically arranged on the left and right sides of helmet 200. First and second rails 300a, 300b in some embodiments may have configurations similar to the rails shown and described, for example, in U.S. Pat. Nos. 7,908,667, 8,028,344, U.S. Patent Application Publication No. 2015-0089726, and U.S. Patent Application Publication No. 2016-0088891, each of which are hereby incorporated by reference in its entirety. In some embodiments, first and second rails 300a, 300b may be combined with visor system 100 in a kit for mounting onto helmet 200. In some such embodiments, first and second anchors 156a, 156b may be preinstalled onto first and second rails 300a, 300b. In further embodiments, a kit according to the present invention may further include helmet 200 onto which first and second rails 300a, 300b and visor system 100 may be mounted.

Figure 8A:
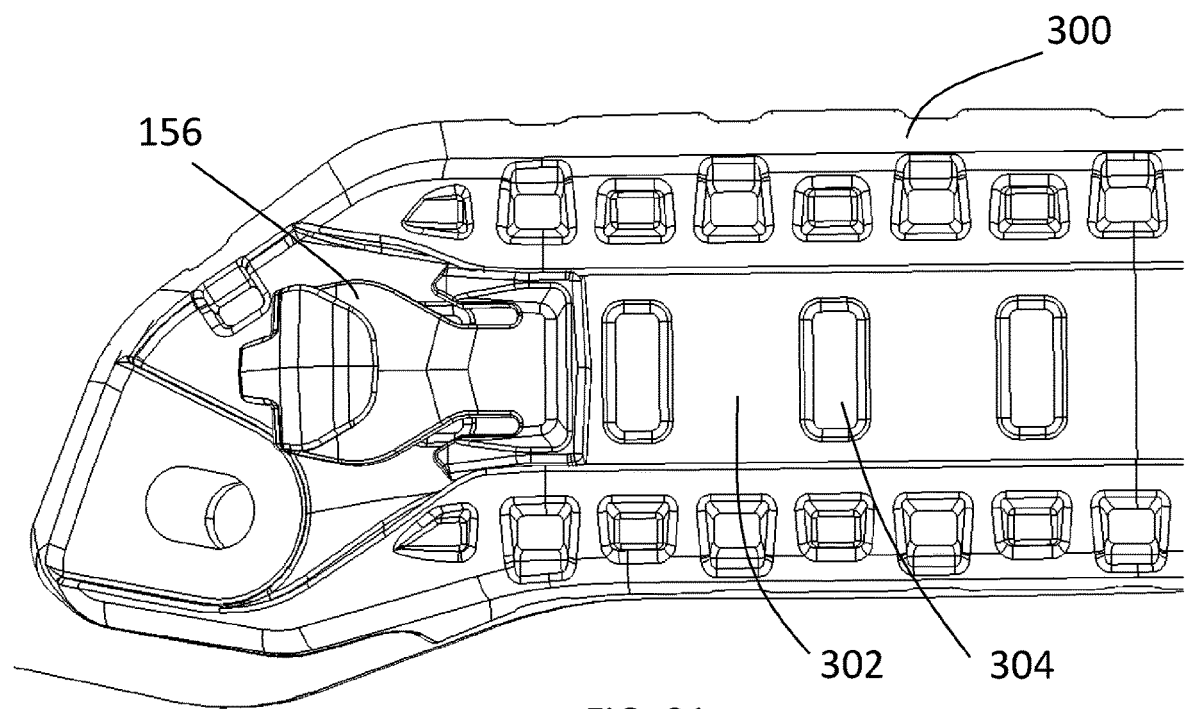
FIGS. 8A and 8B are side views showing an anchor of the visor system mounted at different positions along a rail according to an embodiment of the present invention.
Figure 8B:
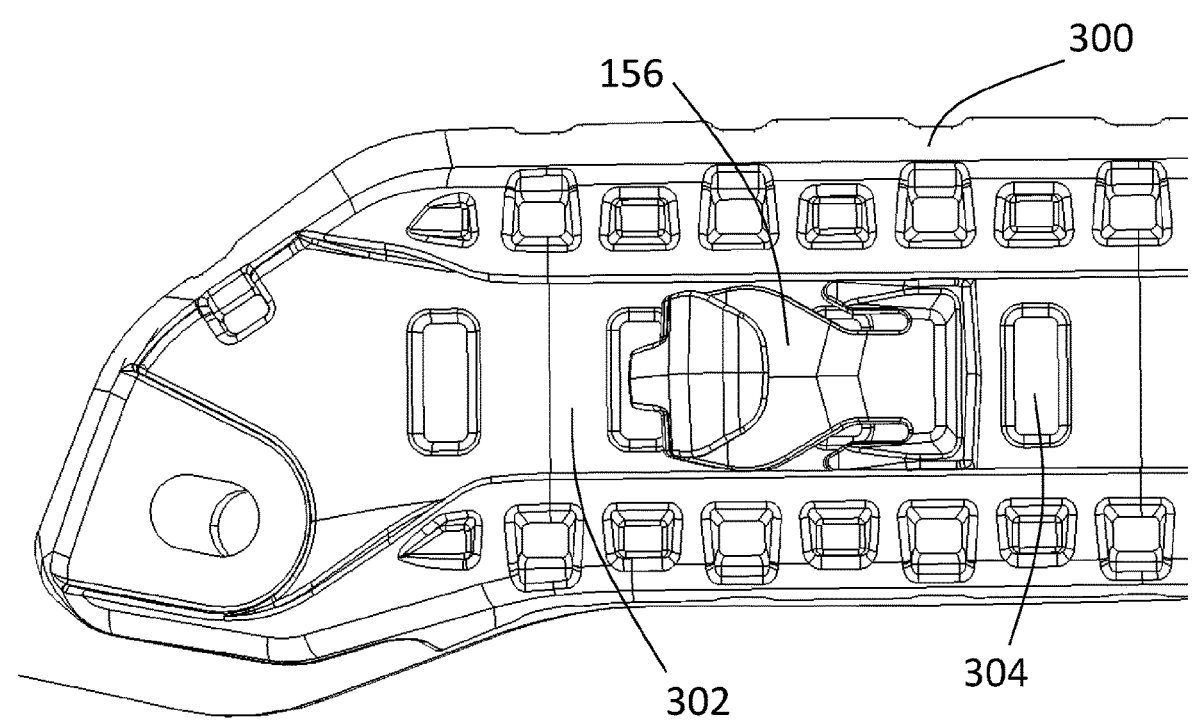
Figure 9A:
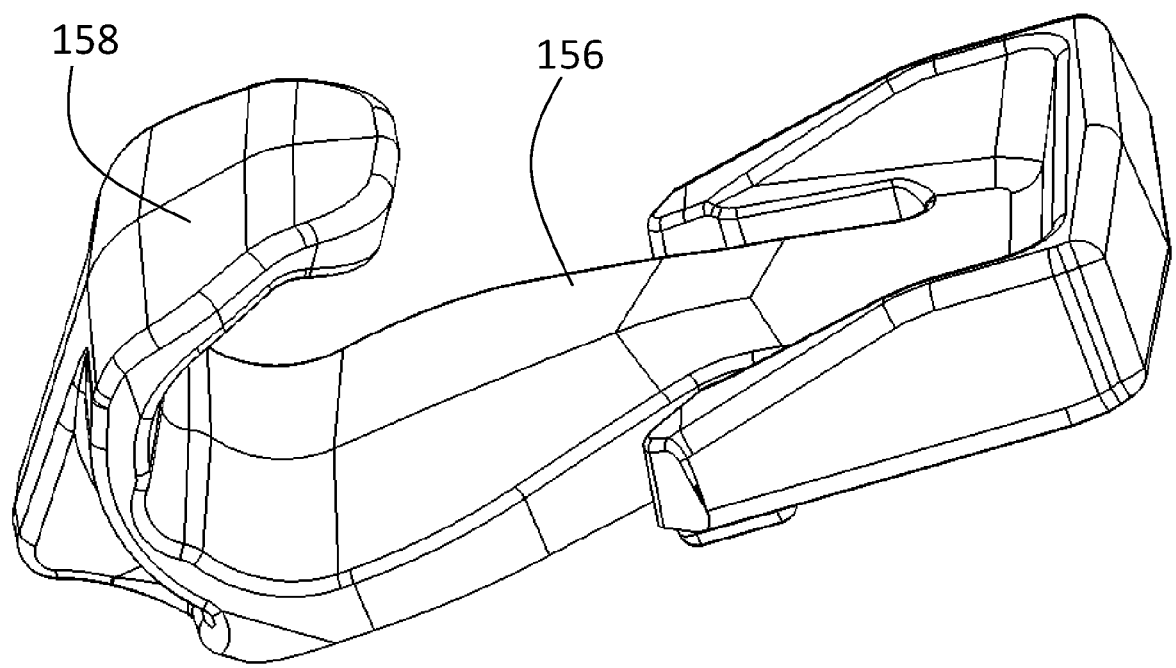
FIGS. 9A and 9B are perspective views of the anchor of the visor system according to an embodiment of the present invention.
Figure 9B:
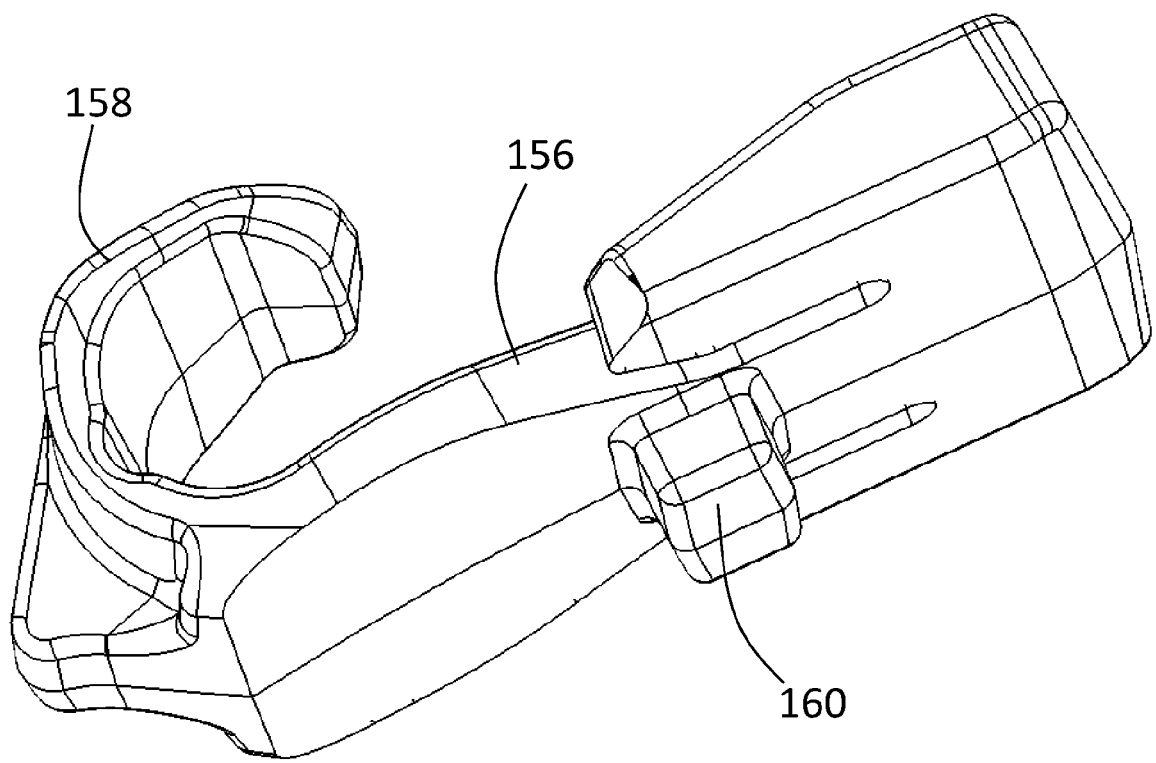
Figure 9C:
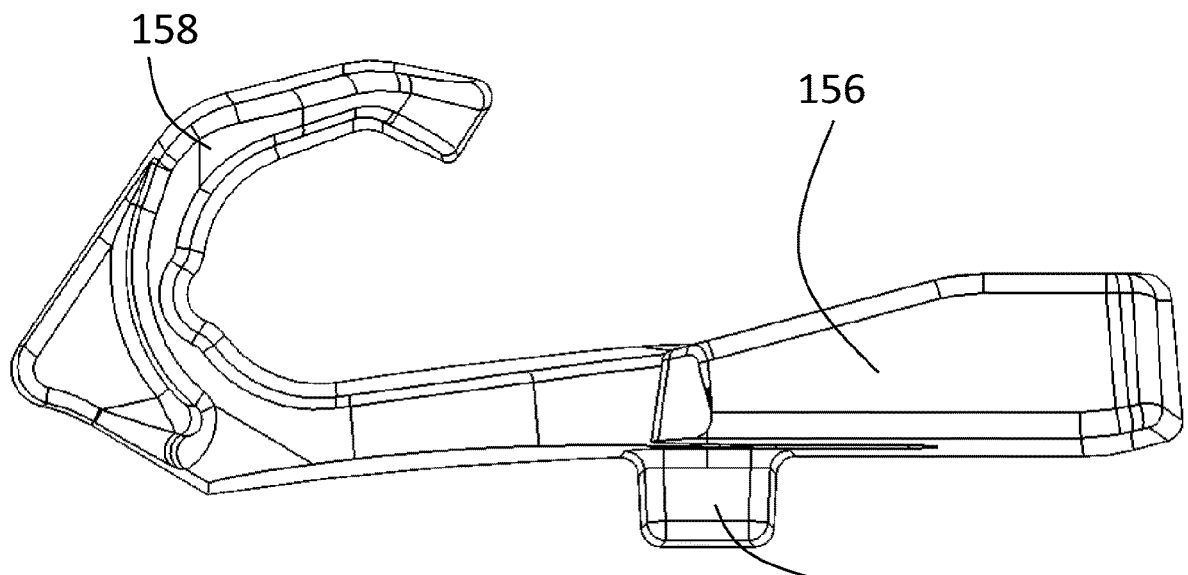
FIG. 9C is a profile view of the anchor of FIGS. 9A and 9B.
Figure 10:
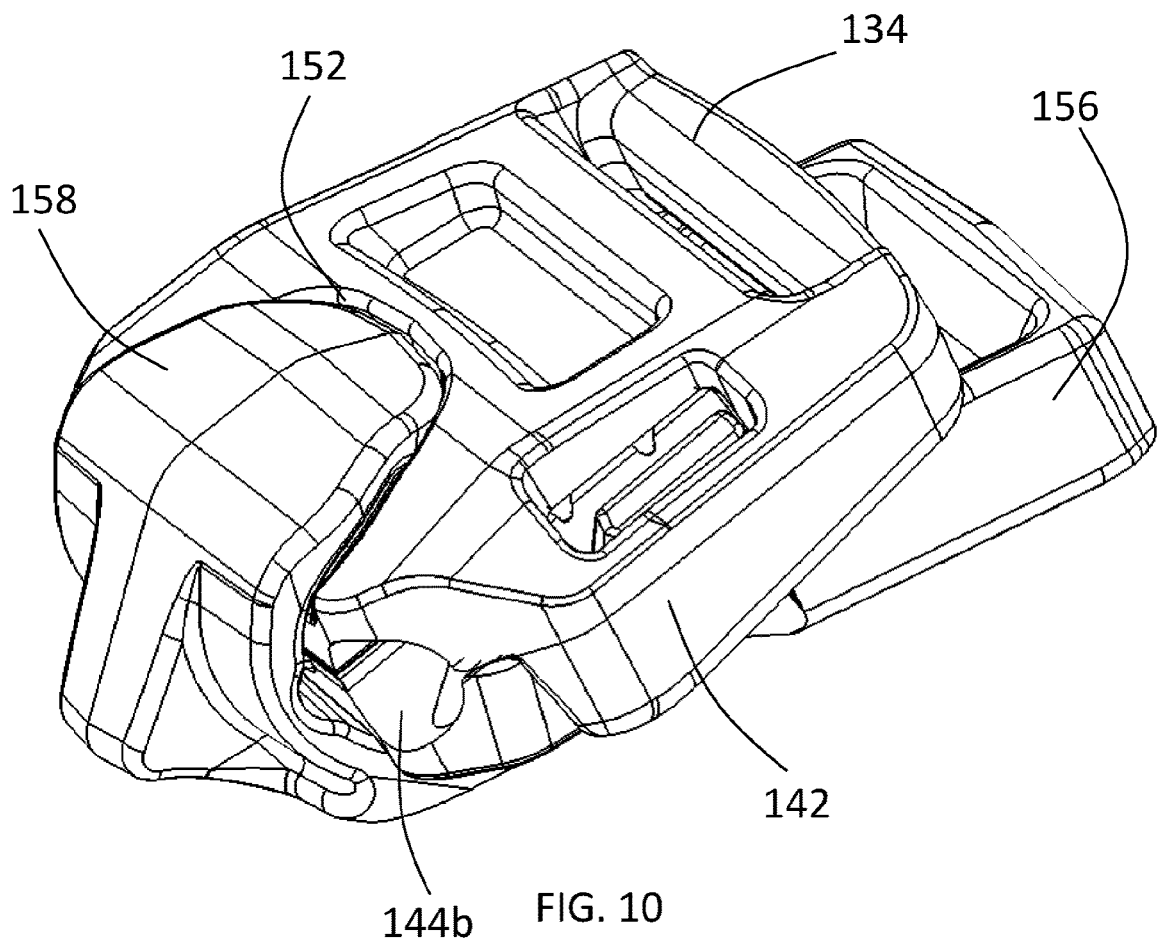
FIG. 10 is a perspective view showing a fastener engaged with an anchor according to an embodiment of the present invention.

Referring now to FIGS. 8A and 8B, rail 300, which may represent either first and/or second rail 300a, 300b, defines a groove or channel 302 in which an anchor 156 may be positioned. In some embodiments, anchor 156 may be secured to different locations within groove or channel 302. For example, FIG. 8A shows anchor 156 at a first position along rail 300 and FIG. 8B shows anchor 156 at a second position along rail 300. In some embodiments, anchor 156 may be frictionally held in position along rail 300. In some embodiments, anchor 156 may have a dovetail fit with groove or channel 302. In some embodiments, rail 300 includes one or more indents 304 which are configured to receive a portion of anchor 156. For example, as shown in FIGS. 9A-9C, in some embodiments, anchor 156 may include a protrusion 160 which may be received in one of the one or more indents 304 of rail 300. As further shown in FIGS. 9A-9C, in some embodiments, anchor 156, which may represent either first and/or second anchor 156a, 156b, includes a hook 158 which is sized and configured to hook onto fastener 134. In some embodiments, hook 158 defines a groove which is sized and configured to receive at least a portion of the front end of housing 142 of fastener 134. In some embodiments, hook 158 is configured to hook onto housing 142 at a portion between openings 144a, 144b. In some embodiments, housing 142 of fastener 134 includes at least a first indent 152 configured to receive and abut with a portion of hook 158 when fastener 134 is received in the groove defined by hook 158. FIG. 10 illustrates the engagement of fastener 134 with anchor 156 according to some embodiments. In further embodiments, housing 142 of fastener 134 may include a second indent 154 (FIG. 6B) which may be configured to receive and abut with a second portion of hook 158 when fastener 134 is received in the groove defined by hook 158.

Figure 11A:
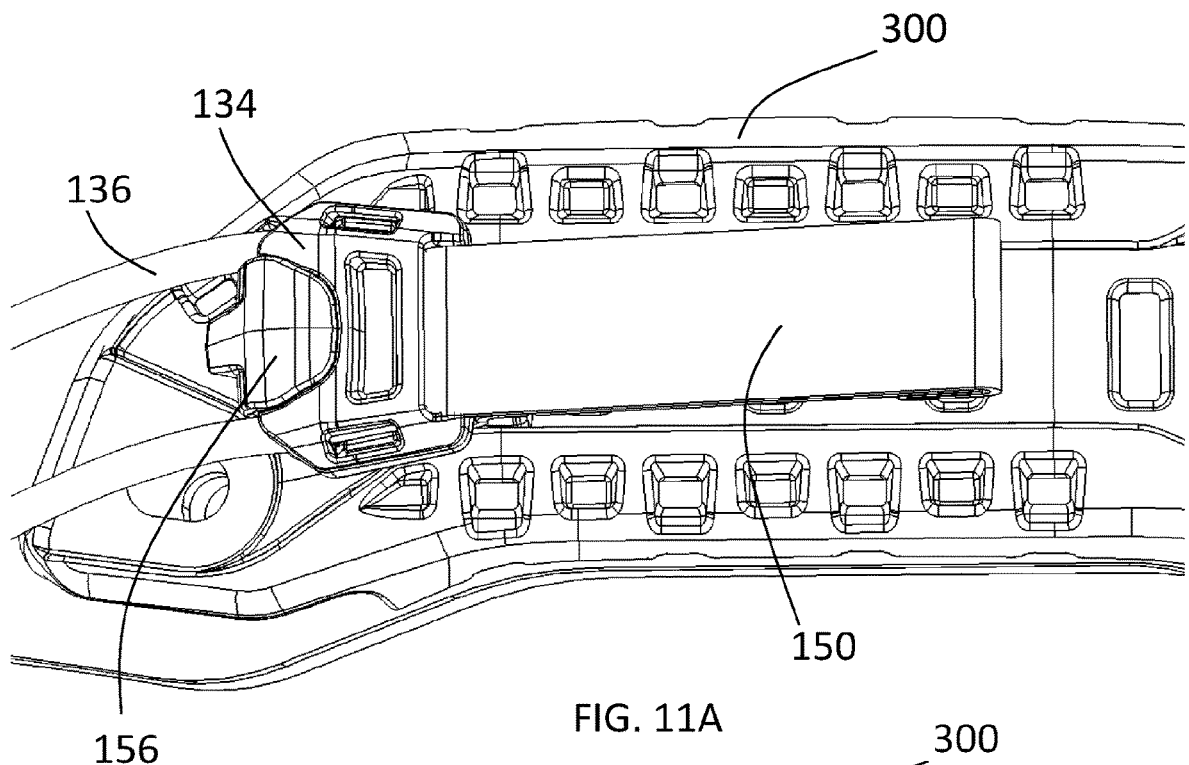
FIG. 11A is a side view showing a fastener with strap engaged with an anchor mounted onto a rail.
Figure 11B:
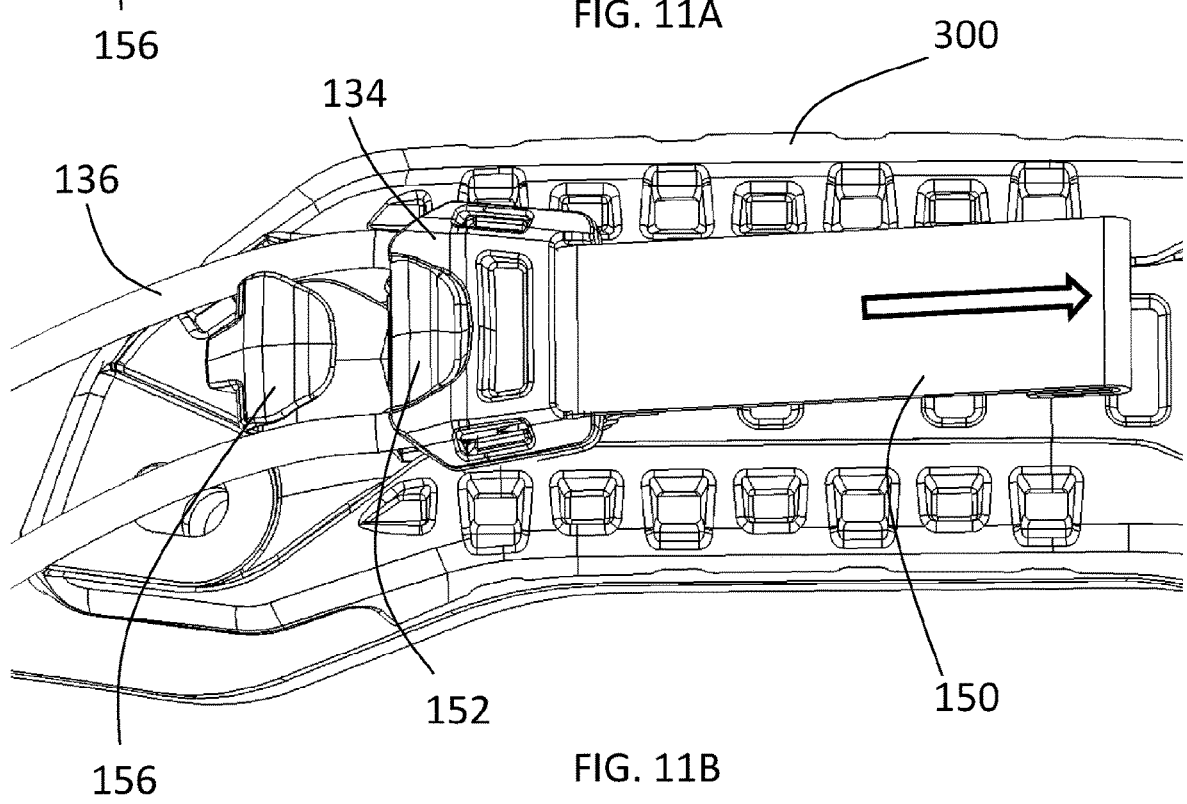
FIG. 11B is a side view showing the fastener of FIG. 11A being disengaged from the anchor.

In some embodiments, when first and second fasteners 134a, 134b are engaged with first and second anchors 156a, 156b as shown in FIGS. 1A-1D, frame 114 is securely held against front portion 202 of helmet 200 by the tension of first and second attachments 136a, 136b, which in turn holds lens 102 in position. In some embodiments, frame 114 and lens 102 may be dismounted from helmet 202 by uncoupling first and second fasteners 134a, 134b from first and second anchors 156a, 156b. In some embodiments, as mentioned previously, first and second fasteners 134a, 134b may be provided with pull straps 150a, 150b which facilitates the uncoupling of first and second fasteners 134a, 134b from first and second anchors 156a, 156b by the user. FIGS. 11A and 11B show the disengagement of fastener 134 from anchor 156 according to one embodiment. In FIG. 11A, fastener 134 is engaged with anchor 156 while anchor 156 is mounted in rail 300. Tension from flexible attachment 136 in some embodiments helps maintain fastener 134 engaged with anchor 156. By pulling on pull strap 150, e.g., by hand, in the direction shown by the arrow in FIG. 11B, fastener 134 may be uncoupled from anchor 156 while flexible attachment 136 may be stretched by virtue of its elastic quality. Thus, in some embodiments, visor system 100 can be dismounted from the front portion 202 of helmet 200 by hand without the use of any additional tools and without having to first remove helmet 200 from the user's head. Once disengaged from anchor 156, pull strap 150 may be coupled to hook or loop patch 206a or 206b provided on helmet 200 to stow visor system 100 on top of helmet 200 as shown, for example, FIG. 12. In the embodiment of FIG. 12, first fastener 134a is uncoupled from first anchor 156a and strap 150a is attached to hook or loop patch 206a located on a side of helmet 200. Lens 102 according to this embodiment may be stowed on top of helmet 200 above front portion 202 and away from the user's face.

In some embodiments, visor system 100 may be configured to allow the user to further tighten visor system 100 to increase the tension of frame 114 against helmet 200 to hold visor system 100 more securely in place. This may be advantageous, for example, when visor system 100 is exposed to strong wind or vibrations. In some embodiments, the length of one or both of first and second flexible attachments 136a, 136b between frame 114 and first and second fasteners 134a, 134b may be adjusted by the user in order adjust the tension and tightness of visor system 100. In some embodiments, a user is able to adjust first and second flexible attachments 136a, 136b either while visor system 100 is mounted on helmet 200 or while visor system 100 is dismounted from helmet 200.

Figure 13:
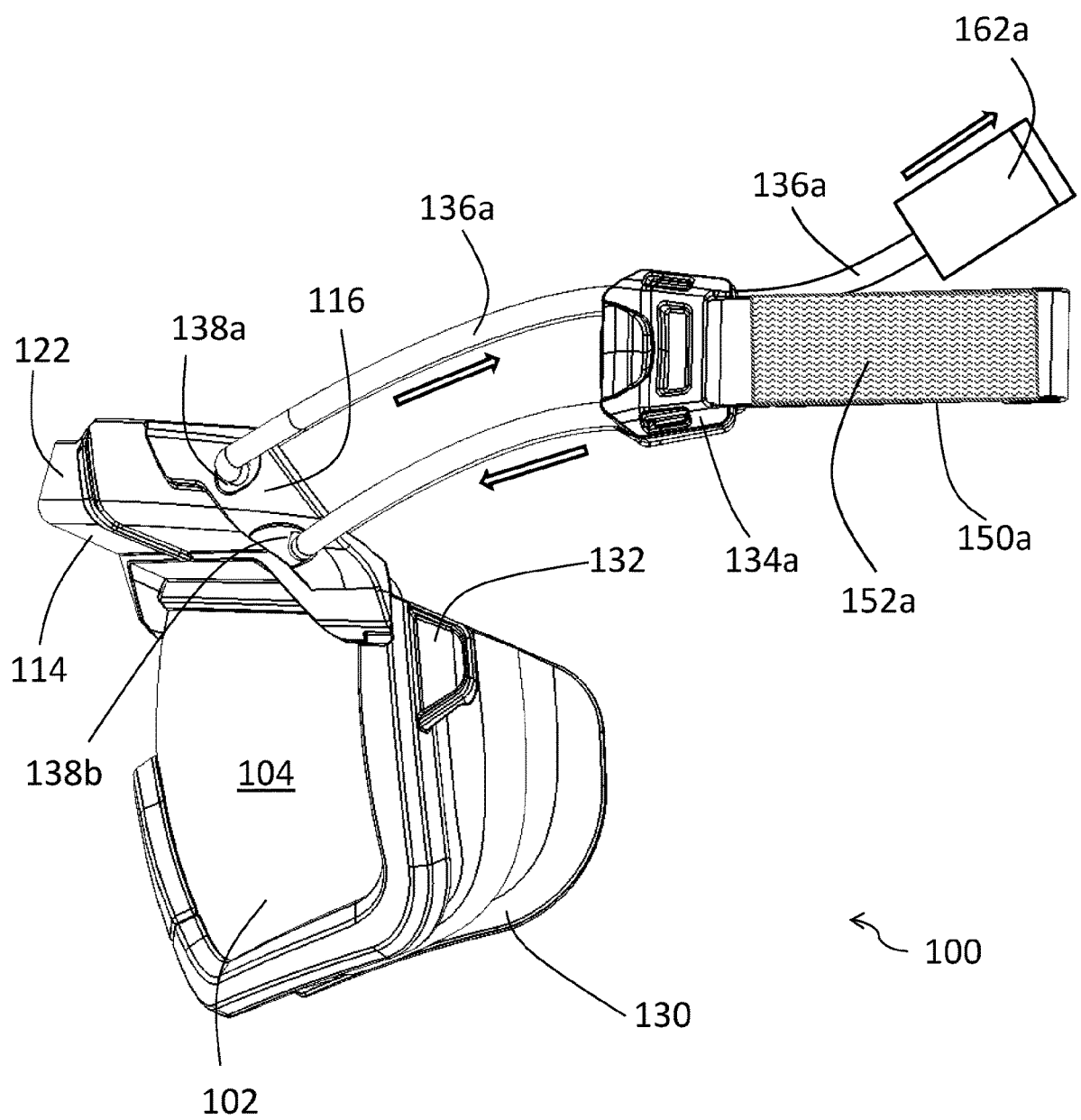
FIG. 13 is a side view of a visor system according to a further embodiment of the present invention having an adjustable flexible attachment.

Referring now to FIG. 13, in some embodiments a first end of first flexible attachment 136a may be threaded through and moveable with respect to first fastener 134a. A second end of first flexible attachment 136a may be fixed relative to first fastener 134a according to some embodiments. In some embodiments, visor system 100 is configured such that the first end of first flexible attachment 136a may be pulled in order draw first flexible attachment 136a through first fastener 134a to shorten the length of first flexible attachment 136a between frame 114 and first fastener 134a. This in turn increases the tension of visor system 100 when visor system 100 is engaged with helmet 200 according to some such embodiments, resulting in a tighter engagement. Thus, in some such embodiments, visor system 100 may be cinched tighter against helmet 200 while visor system 100 is mounted onto helmet 200 and without having to first remove visor system 100 from helmet 200.

In some embodiments, the first end of first flexible attachment 136a may be provided with an adjustment tab 162a which is configured to be grasped and pulled by the user (e.g., using a single hand) to adjust first flexible attachment 136a. Adjustment tab 162a, for instance, may include a strap or webbing piece attached to the first end of first flexible attachment 136a. In some embodiments, adjustment tab 162a may be similar in construction as pull strap 150a. As shown for example in FIG. 13, adjustment tab 162a may be pulled in a direction generally depicted by the adjacent arrow, which in turn pulls the top portion of first flexible attachment 136a through first fastener 134a while the bottom portion of first flexible attachment 136a and first fastener 134a is drawn closer to frame 114. This movement may be reversible in order to loosen visor system 100. It should be appreciated that second flexible attachment 136b and second fastener 134b may also have a similar configuration to permit for adjustment in a likewise manner. It should also be appreciated that the lengths of first flexible attachment 136a and second flexible attachment 136b may be so adjusted by the user prior to mounting visor system 100 onto helmet 200 according to certain embodiments.

Figure 14:
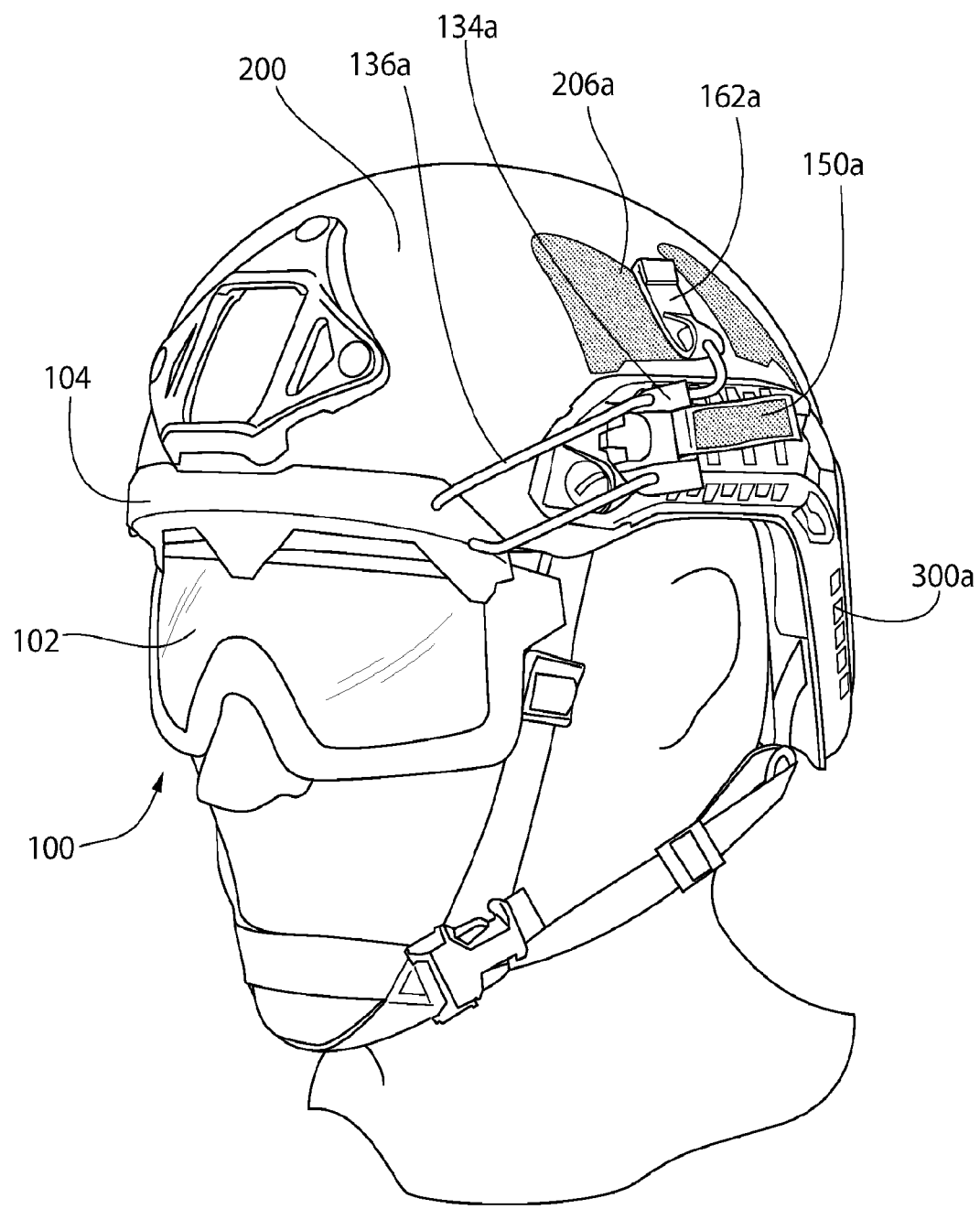
FIG. 14 is a perspective view showing a visor system with an adjustable flexible attachment that is secured in first position according to an embodiment.
Figure 15:
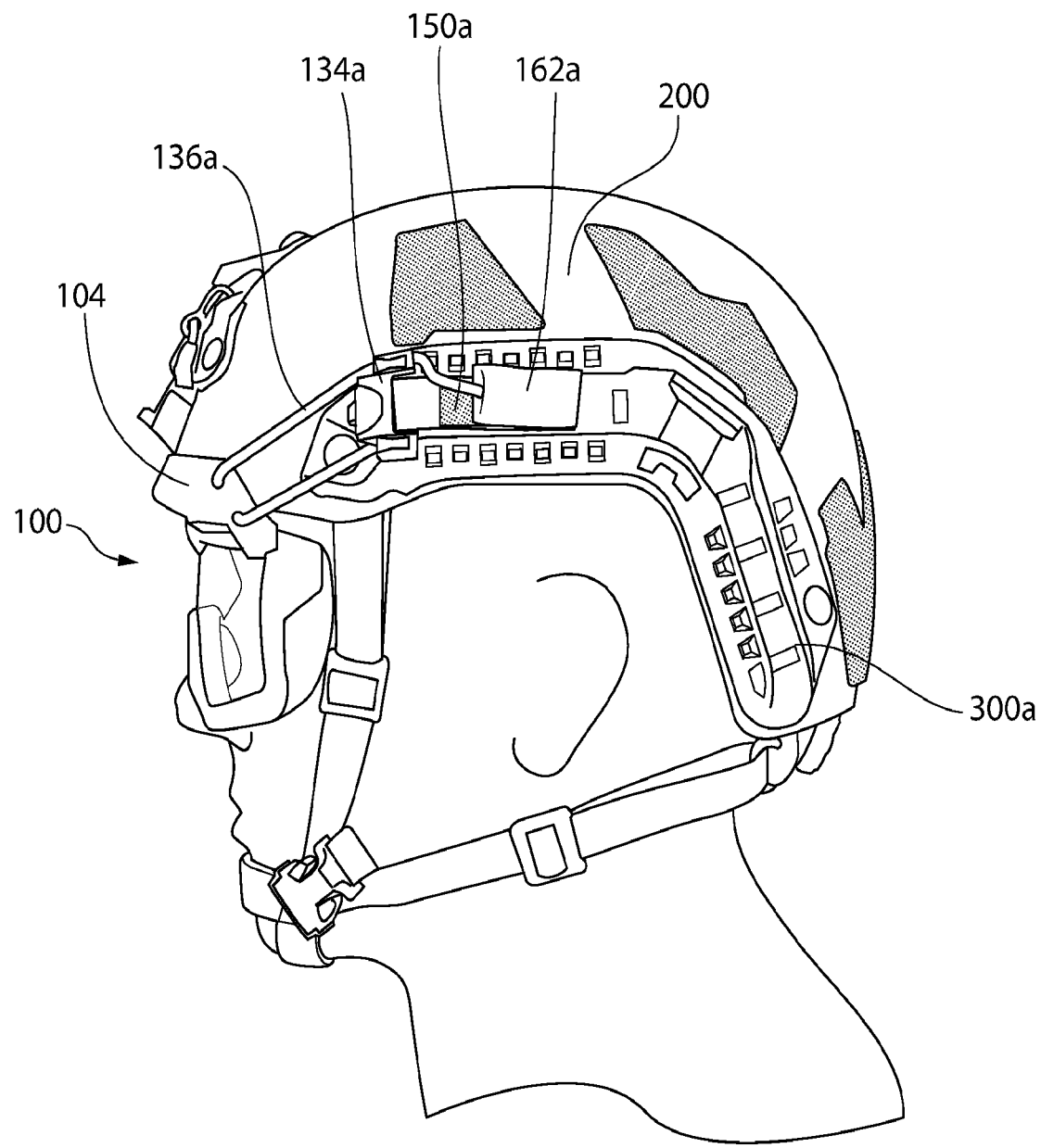
FIG. 15 is a side view of the visor system of FIG. 14 with the adjustable flexible attachment secured in a second position according to a further embodiment.

In some embodiments, adjustment tab 162 may be configured to be releasably secured to helmet 200 and/or another component of visor system 100. Such a configuration, in some embodiments, allows adjustment tab 162a and to be held in position (e.g., relative to first fastener 134a) after the user has adjusted first flexible attachment 136a so that the tension can be maintained and substantial loosening is prevented. In some embodiments, adjustment tab 162a may include a hook or loop patch which is configured to fasten to hook or loop patch 206a on helmet 200, as shown for example in FIG. 14. In some embodiments, adjustment tab 162a may include a hook or loop patch which is configured to fasten to hook or loop patches 152a on pull strap 150a, as shown for example in FIG. 15. When further adjustment is required (e.g., tightening or loosening), the user may disengage adjustment tab 162a from hook or loop patches 206a and/or 152a by pulling adjustment tab 162a with sufficient force. Other types of releasable securements may be used in addition to or as alternatives to hook and loop patches to secure adjustment tab 162a in place, for example, snap fasteners, magnetic fasteners, hook-and-eye closures, etc.

It should be understood that various changes, substitutions, and alterations can be made herein without departing from the spirit and scope of the invention as defined by the appended claims. It should also be apparent that individual elements identified herein as belonging to a particular embodiment may be included in other embodiments of the invention. Moreover, the scope of the present application is not intended to be limited to the particular embodiments of the process, machine, manufacture, and composition of matter, means, methods and steps described in the specification. As one of ordinary skill in the art will readily appreciate from the disclosure herein, processes, machines, manufacture, composition of matter, means, methods, or steps that perform substantially the same function or achieve substantially the same result as the corresponding embodiments described herein may be utilized according to the present invention.

What is claimed is:

1. A visor for a helmet, the visor comprising:
a lens sized to extend across at least a portion of a user's face in use and having an inner surface facing the user's face when in use and an outer surface facing away from the user's face when in use;
a frame secured along a top portion of the lens, the frame including a stepped portion having a first end proximate the outer surface of the lens and a second end opposite the first end, the stepped portion extending outwardly away from the outer surface of the lens from the first end to the second end, such that the first and the second end are outward from the outer surface of the lens, and the stepped portion configured to abut against a bottom edge of the helmet where the stepped portion extends outwardly away from the outer surface of the lens, and the frame including a lip coupled to the second end of the stepped portion and extending upwardly from the second end of the stepped portion, the frame configured to receive and abut against a front surface of the helmet when the lens extends across the at least a portion of the user's face;

a first fastener coupled to a first end of the frame by a first strap;

a second fastener coupled to a second end of the frame by a second strap;

a first anchor releasably securable to the first fastener, the first anchor being mountable onto a first portion of the helmet; and a second anchor releasably securable to the second fastener, the second anchor being mountable onto a second portion of the helmet.

2. The visor of claim 1, wherein the first strap comprises a first elastic cord and the second strap comprises a second elastic cord.

3. The visor of claim 2, wherein the first elastic cord is received through a hole positioned at the first end of the frame, and wherein the second elastic cord is received through a hole positioned at the second end of the frame.

4. The visor of claim 2, wherein the first elastic cord forms a first loop and the second elastic cord forms a second loop.

5. The visor of claim 2, wherein an end of the first elastic cord is secured to the first fastener, and wherein an end of the second elastic cord is secured to the second fastener.

6. The visor of claim 1, wherein the first anchor comprises a first hook defining a groove for receiving the first fastener, and wherein the second anchor comprises a second hook defining a groove for receiving the second fastener.

7. The visor of claim 6, wherein the first fastener comprises an indent for receiving a portion of the first hook when the first fastener is received in the groove defined by the first hook, and wherein the second fastener comprises an indent for receiving a portion of the second hook when the second fastener is received in the groove defined by the second hook.

8. The visor of claim 1, wherein the first anchor is mountable onto a first dovetail shaped groove of a first rail positioned on the first portion of the helmet and the second anchor is mountable onto a second dovetail shaped groove of a second rail positioned on the second portion of the helmet, wherein the first anchor includes a protrusion configured to secure the first anchor to the first dovetail shaped groove and the second anchor includes a protrusion configured to secure the second anchor to the second dovetail shaped groove.

9. The visor of claim 8, wherein the first anchor is mountable at a plurality of positions along the first rail, and wherein the second anchor is mountable at a plurality of positions along the second rail.

10. The visor of claim 1, wherein each of the first fastener and the second fastener comprises a pull strap having a hook or loop patch, the pull straps extending from the first fastener and second fastener, respectively, in a direction opposite the first strap and second strap.

11. The visor of claim 10, wherein each of the first fastener and the second fastener comprises a slot, and wherein the pull strap passes through the slot.

12. The visor of claim 1, further comprising a seal positioned along at least a bottom edge and/or a side edge of the lens, the seal configured to abut against the user's face during use.

13. The visor of claim 12, wherein the seal comprises a groove for receiving at least the bottom edge and/or the side edges of the lens.

14. The visor of claim 12, wherein the seal comprises a pull tab for separating the seal from the lens.

15. The visor of claim 1, wherein the lens does not protrude beyond the front surface of the helmet when the visor is mounted onto the helmet.

16. The visor of claim 1, wherein the first strap includes an end which is threaded through and movable with respect to the first fastener and/or the second strap includes an end which is threaded through and movable with respect to the second fastener.

17. A kit comprising:
the visor of claim 1;
a first rail having a channel and configured to be secured to a first side of the helmet; and
a second rail having a channel and configured to be secured to a second side of the helmet,
wherein the first anchor is mountable in the channel of the first rail, and the second anchor is mountable in the channel of the second rail.

18. The kit of claim 17, further comprising the helmet, wherein the lens is positioned inwardly from the front surface of the helmet.

19. The visor of claim 1, wherein the lip of the frame extends upwardly from a periphery of the stepped portion and inwardly toward the outer surface of the lens.

20. A visor for a helmet, the visor comprising:
a lens sized to extend across at least a portion of a user's face in use and having an inner surface facing the user's face when in use and an outer surface facing away from the user's face when in use;
a frame secured along a top portion of the lens, the frame including a stepped portion having a first end proximate the outer surface of the lens and a second end opposite the first end, the stepped portion extending outwardly away from the outer surface of the lens from the first end to the second end and configured to abut against a bottom edge of the helmet where the stepped portion extends outwardly away from the outer surface of the lens, a lip coupled to the second end of the stepped portion and extending upwardly from the stepped portion, and a spacer attached to and at least partially covering an inner surface of the lip the frame configured to receive and abut against a front surface of the helmet when the lens extends across the at least a portion of the user's face;
a first fastener coupled to a first end of the frame by a first strap;
a second fastener coupled to a second end of the frame by a second strap;
a first anchor releasably securable to the first fastener, the first anchor being mountable onto a first portion of the helmet; and
a second anchor releasably securable to the second fastener, the second anchor being mountable onto a second portion of the helmet.

21. The visor of claim 20, wherein the spacer is comprised of foam, elastomer, silicone, rubber, or gel.

22. A visor for a helmet, the visor comprising:
a lens sized to extend across at least a portion of a user's face in use and having an inner surface facing the user's face when in use and an outer surface facing away from the user's face when in use, the lens including a bottom edge and two side edges;

a frame secured along a top portion of the lens, the frame including a stepped portion extending outwardly away from the outer surface of the lens and configured to abut against a bottom edge of the helmet and a lip extending upwardly from a distal end of the stepped portion and having a spacer comprised of an elastomeric material and positioned on an inner surface of the lip, the spacer configured to receive and abut against a front surface of the helmet when the lens extends across the at least a portion of the user's face;

a first fastener coupled to a first end of the frame by a first strap, the first fastener including a first pull strap having a hook or loop patch and extending from the first fastener in a direction opposite the first strap;

a second fastener coupled to a second end of the frame by a second strap, the second fastener including a second pull strap having a hook or loop patch and extending from the second fastener in a direction opposite the second strap;

a first anchor releasably securable to the first fastener, the first anchor being mountable onto a first dovetail shaped groove of a first rail positioned on a first portion of the helmet;

a second anchor releasably securable to the second fastener, the second anchor being mountable onto a second dovetail shaped groove of a second rail positioned on a second portion of the helmet, the first anchor including a protrusion configured to secure the first anchor to the first dovetail shaped groove and second anchor including a protrusion configured to secure the second anchor to the second dovetail shaped groove; and a seal positioned along the bottom edge and each of the two side edges of the lens, the seal configured to abut against the user's face during use, wherein the spacer is attached to and extends from a back surface of the lip and is positioned between the lip and the front surface of the helmet when the visor is mounted onto the helmet.

\* \* \* \* \*